(12) United States Patent
Hull et al.

(10) Patent No.: US 9,226,590 B1
(45) Date of Patent: Jan. 5, 2016

(54) FOLDABLE BEDDING FOUNDATION HAVING L-SHAPED SPACERS

(71) Applicant: L&P Property Management Company, South Gate, CA (US)

(72) Inventors: John E. Hull, Monett, MO (US); David W. Redick, Carthage, MO (US)

(73) Assignee: L&P Property Management Company, South Gate, CA (US)

( * ) Notice: Subject to any disclaimer, the term of this patent is extended or adjusted under 35 U.S.C. 154(b) by 0 days.

(21) Appl. No.: 14/492,182

(22) Filed: Sep. 22, 2014

(51) Int. Cl.
| A47C 19/00 | (2006.01) |
| A47C 23/00 | (2006.01) |
| A47C 19/12 | (2006.01) |
| A47C 19/02 | (2006.01) |
| F16B 12/56 | (2006.01) |

(52) U.S. Cl.
CPC ............... *A47C 23/005* (2013.01); *A47C 19/02* (2013.01); *A47C 19/12* (2013.01); *F16B 12/56* (2013.01)

(58) Field of Classification Search
CPC .... A47C 23/005; A47C 19/005; A47C 19/02; A47C 19/12; A47C 19/124; A47C 19/126; F16B 12/54; F16B 12/56
See application file for complete search history.

(56) References Cited

U.S. PATENT DOCUMENTS

| 3,863,278 A * | 2/1975 | Herrera ................................. 5/3 |
| 4,251,892 A | 2/1981 | Hancock |
| 4,377,279 A | 3/1983 | Schulz, Jr. et al. |
| 4,489,450 A | 12/1984 | Miller |
| 4,620,336 A | 11/1986 | Miller |
| 4,654,905 A | 4/1987 | Miller |
| 4,704,752 A | 11/1987 | Yates et al. |
| 4,770,397 A | 9/1988 | Schulz, Jr. |
| 4,771,995 A | 9/1988 | Wells et al. |
| 4,903,949 A | 2/1990 | Schulz, Jr. |
| 5,165,125 A | 11/1992 | Callaway |
| 5,167,393 A | 12/1992 | Hayakawa et al. |
| 5,346,188 A | 9/1994 | Rodgers et al. |
| 5,502,930 A | 4/1996 | Burkette et al. |
| 5,551,104 A | 9/1996 | Hartline |
| 5,622,357 A | 4/1997 | Schulz, Jr. et al. |
| 5,720,471 A | 2/1998 | Constantinescu et al. |
| 5,765,240 A | 6/1998 | Workman |
| 5,950,260 A | 9/1999 | Dees |
| 6,012,190 A | 1/2000 | Rogers |
| 6,032,307 A | 3/2000 | Workman |
| 6,581,223 B1 * | 6/2003 | Wang ................................. 5/174 |
| 6,651,276 B2 | 11/2003 | McCraw et al. |
| 6,729,610 B2 | 5/2004 | Constantinescu |
| 7,376,988 B2 | 5/2008 | Wickstrom et al. |
| 7,503,086 B2 | 3/2009 | Wickstrom et al. |
| 8,312,576 B1 | 11/2012 | Oh |
| 8,370,973 B1 | 2/2013 | Oh |
| 8,769,740 B2 | 7/2014 | Oh |
| 2008/0000024 A1 * | 1/2008 | Peixin et al. ................. 5/112 |
| 2009/0293193 A1 * | 12/2009 | Neatherry et al. ................. 5/1 |
| 2012/0042449 A1 * | 2/2012 | Hull et al. ................. 5/246 |
| 2013/0067659 A1 * | 3/2013 | Oh ................. 5/400 |

\* cited by examiner

*Primary Examiner* — David E Sosnowski
(74) *Attorney, Agent, or Firm* — Wood, Herron & Evans, LLP

(57) ABSTRACT

A foldable bedding foundation comprising a first section is hingedly secured to a second section so that the bedding foundation may be folded for storage or transportation purposes. Each section has a base, an upper deck and a plurality of generally L-shaped spacers pivotally secured to the base and upper deck. Upper and lower hinges extend between the base and upper deck of each section. Locking members extending through the spacers maintain the foundation in its erected position.

17 Claims, 21 Drawing Sheets

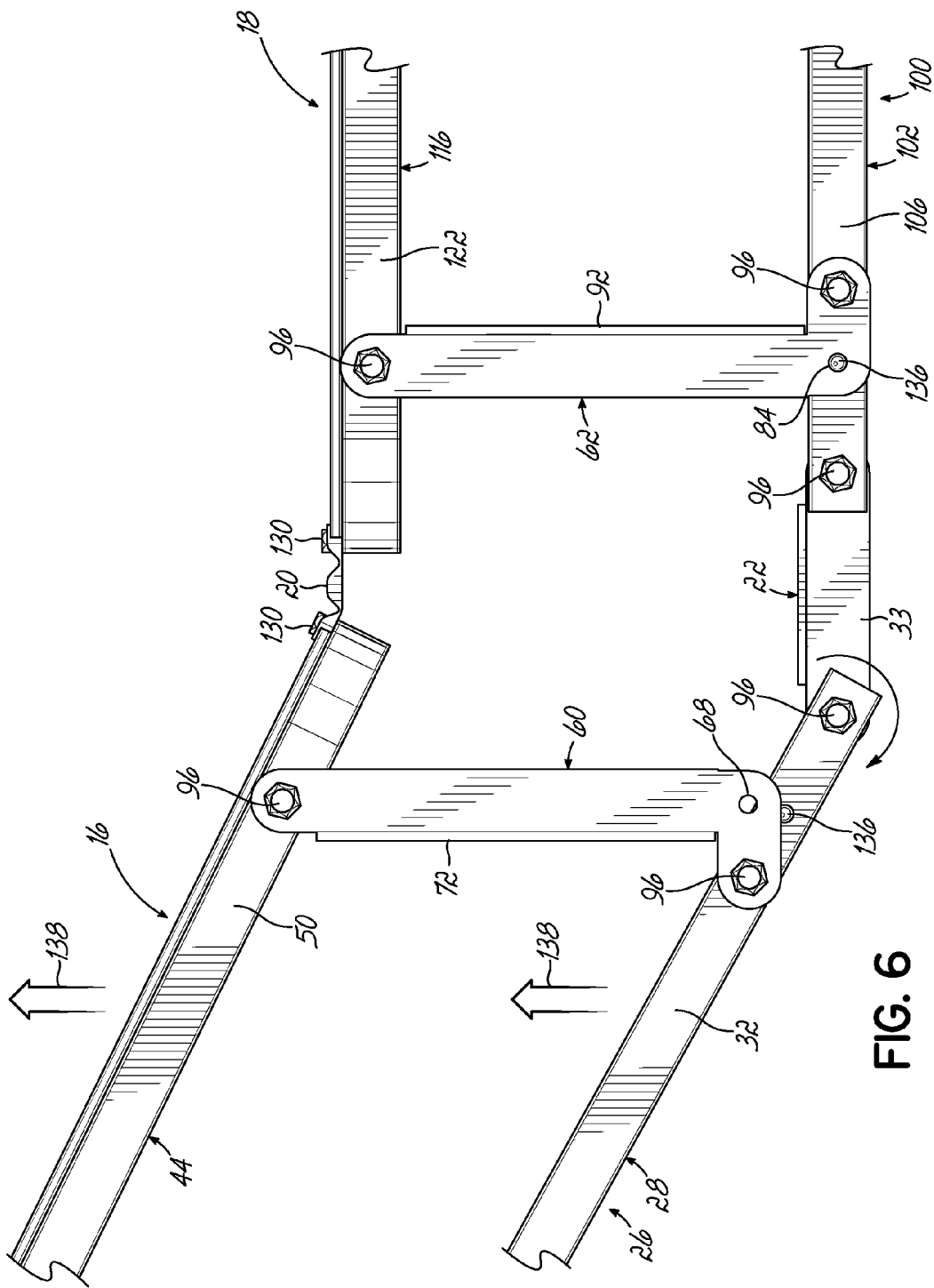

FOLDABLE BEDDING FOUNDATION HAVING L-SHAPED SPACERS

FIELD OF THE INVENTION

This invention relates generally to bedding foundations and, more particularly, to a bedding foundation which is collapsible for storage and shipment.

BACKGROUND OF THE INVENTION

Conventional bedding foundations, such as box springs, typically include an array or matrix of springs, a wooden base and an upper deck, including a generally rectangular border wire. The springs may be coil springs or modular springs. The components are commonly shipped from a spring manufacturer to a box spring manufacturer separately. Once the components arrive at the box spring manufacturer's facility, the box spring manufacturer attaches the lower ends of the springs, which extend downwardly from an upper deck assembly to a base. Padding and a cover is applied by the box spring manufacturer as desired. Such conventional bedding foundations are large and cumbersome to handle in storage, transportation or shipment which, of course, increases the ultimate cost.

Moreover, it is not uncommon for a coil spring manufacturer to compress or deform coil spring units layered one on top of the other into condensed or compacted multilayered packs for shipment to a box spring manufacturer. The aforementioned step is performed by means of a press machine, enabling the foundation units to be compressed to reduce their height dimension. The coil spring units of each pack are held in their compacted state against return to their normal or unstressed condition by means of strapping applied about the unit. The spring units of each pack being compressed, the strapping is under a great amount of tension. When the packs arrive at the place of the manufacturer, it is, of course, necessary to sever the strapping around the packs in order to release the spring units for installation into box springs or mattresses. This, of course, is difficult because of the high degree of tension to which the strapping is subjected by the compression of the coil springs.

U.S. Pat. No. 4,377,279 discloses a wire foundation unit for a box spring which may be shipped to a box spring manufacturer in a collapsed condition. The manufacturer would erect the foundation wires and then fix by staples, rigid struts between the wire unit and base to permanently secure the wire unit in the erected position. The box spring manufacturing process is completed by providing the conventional layer of padding on the top of the wire foundation and a sheet covering or casing about the entire unit. However, once the manufacture is completed, the box spring is no longer collapsible and thus, must be shipped in its expanded or full-size state to the point of retail or use whereby the same storage and shipment costs result at this point as with conventional box springs.

U.S. Pat. No. 4,654,905 discloses another collapsible bedding foundation for a box spring which can be shipped to a box spring manufacturer in a collapsed condition. The box spring manufacturer would erect the collapsed bedding foundation before applying padding on the top of the erected bedding foundation and covering or casing the entire unit. The collapsible bedding foundation disclosed in this patent utilizes a hinge to connect two sections of the bedding foundation so that when collapsed, one section may overlay the other section. One drawback to this bedding foundation is that the hinge is expensive, thereby adding substantial cost to the manufacturer of the collapsible bedding foundation, which is, in turn, passed on to the manufacturer of the box spring.

Therefore, there is a need for a collapsible box spring which is less expensive to manufacture than known collapsible box springs. There is further a need for an affordable box spring which may be collapsed after being upholstered.

SUMMARY OF THE INVENTION

The bedding foundation of the present invention comprises two sections which are hingedly secured together with upper and lower hinges. The foundation is movable between a retracted or collapsed position and an extended or erected position. In one embodiment, the foundation is maintained in its erected position by a plurality of locking members. The locking members may be removable or located in the bases of each of the sections.

In one embodiment, each of the sections comprises a base, an upper deck and a plurality of generally L-shaped spacers pivotally secured to the base and upper deck, such that the section may be collapsed. The base of each section comprises a hollow perimeter base member and a longitudinally extending hollow middle base member. The perimeter and middle base members may be made of one or more pieces of metal. The perimeter and middle base members are each made of material known in the industry as rectangular tubing, which has a hollow interior and a generally rectangular cross-sectional configuration. Additional base members may be included.

The upper deck of each section comprises a perimeter deck member and a longitudinally extending middle member. The perimeter deck member has two sides and two ends. The middle deck member extends between the ends of the perimeter deck member. The perimeter deck member and middle deck member each may be made of one or more pieces of metal. The perimeter deck member and middle deck member each may be made of rectangular tubing in order to reduce the weight of the product.

In one embodiment, each section of the foldable foundation comprises two types of generally L-shaped spacers, right-hand and left-hand generally L-shaped spacers. Each of the generally L-shaped spacers is pivotally connected to the base and upper deck of one section. Locking members may be inserted through openings in some of the generally L-shaped spacers to maintain the foundation in an erect position. In one embodiment, the locking members are spring clips located in the hollow interiors of the base members. In another embodiment, the locking members are removable locking pins.

When the spring clips are compressed, or the locking pins removed and the foundation folded, the foundation is substantially reduced in its depth dimension, thereby facilitating storage handling and/or shipment at reduced unit cost. When portions of the locking members extend through openings in at least some of the generally L-shaped spacers, the foundation is secured in an erected position and the foundation is ready for use. After use, the bedding foundation may be collapsed to its storage position and then later expanded to its use or erected position. This process may be repeated as often as desired.

In one embodiment, the covered bedding foundation or body support is constructed to be foldable or collapsible upon itself into two overlying sections, thus reducing the length approximately in half for storage. Collapsing the foundation may require the removal of multiple locking pins in one embodiment or compressing multiple spring clips in another embodiment. On the other hand, erecting the bedding foundation and maintaining the foundation in its erected position for use may require the insertion of locking pins through the base members and openings in the generally L-shaped spacers.

The two sections of the bedding foundation are joined with upper and lower hinges. In one embodiment, lower hinges are secured to the bases of the sections and extend therebetween. Each lower hinge is a linear metal member. Other types or configurations of lower hinges comprising one or more components may be used in accordance with the present invention.

At least one upper hinge is secured to the upper deck of each section and extends therebetween. In one embodiment, the upper hinge comprises a pair of spaced, plastic connectors. The connectors provide spacing between the perimeter members of the upper decks of the foundation sections, which facilitates folding of the foundation, even when covered. However, other types or configurations of upper hinges may be used in accordance with the present invention, such as a single hinge, for example.

BRIEF DESCRIPTION OF THE DRAWINGS

FIG. 6 is a side elevational view of a portion of the bedding foundation of FIG. 1A being collapsed.

DETAILED DESCRIPTION OF THE DRAWINGS

Figure 1:
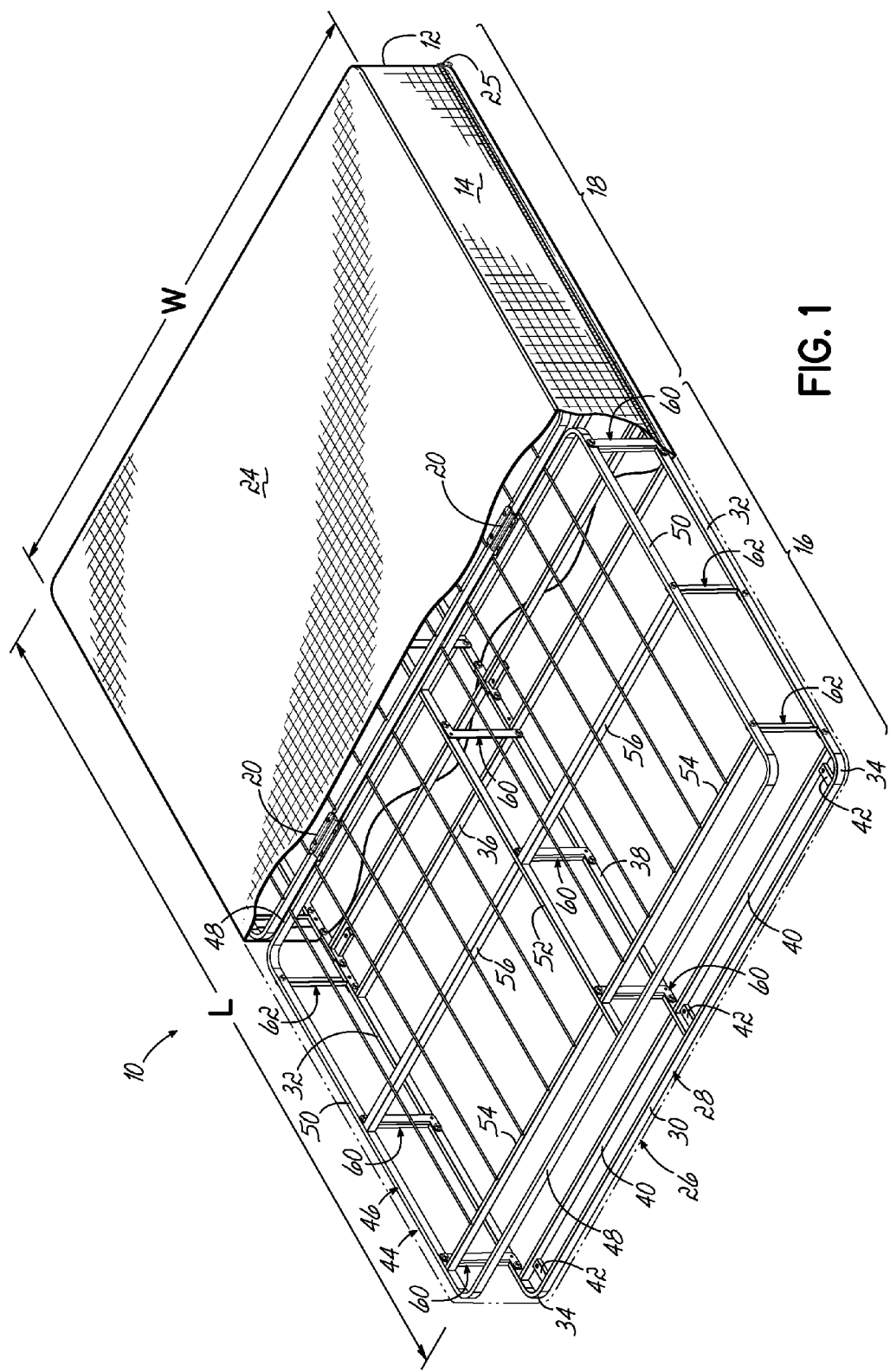
FIG. 1 is a perspective view of one embodiment of the collapsible bedding foundation in an erected condition with a removable cover.

Referring to the drawings, and particularly to FIG. 1, there is illustrated a foldable or collapsible bedding foundation 10. The bedding foundation 10 has a pair of end surfaces 12 defining a length or longitudinal dimension L of the foundation 10 and a pair of opposed side surfaces 14 defining a width W of the foundation 10. The bedding foundation 10 has a first section 16 hinged to a second section 18 with two upper hinges 20 and a lower hinge assembly 22. See FIG. 2. The upper hinges 20 and lower hinge assembly 22 enable the bedding foundation 10 to move from an erected position shown in FIGS. 1 and 1A to a fully collapsed position shown in FIG. 8. Although the drawings illustrate the bedding foundation 10 with no cover, the bedding foundation 10 may be collapsed with a surrounding cover 24 as partially shown in FIG. 1. If desired, padding (not shown) may be placed on at least one surface of the bedding product 10 before the surrounding cover 24 is attached. The cover 24 is illustrated having a zipper 25 therein. However, any removable cover, including the cover 24a illustrated in FIG. 9 and described below, may be used.

Figure 1A:
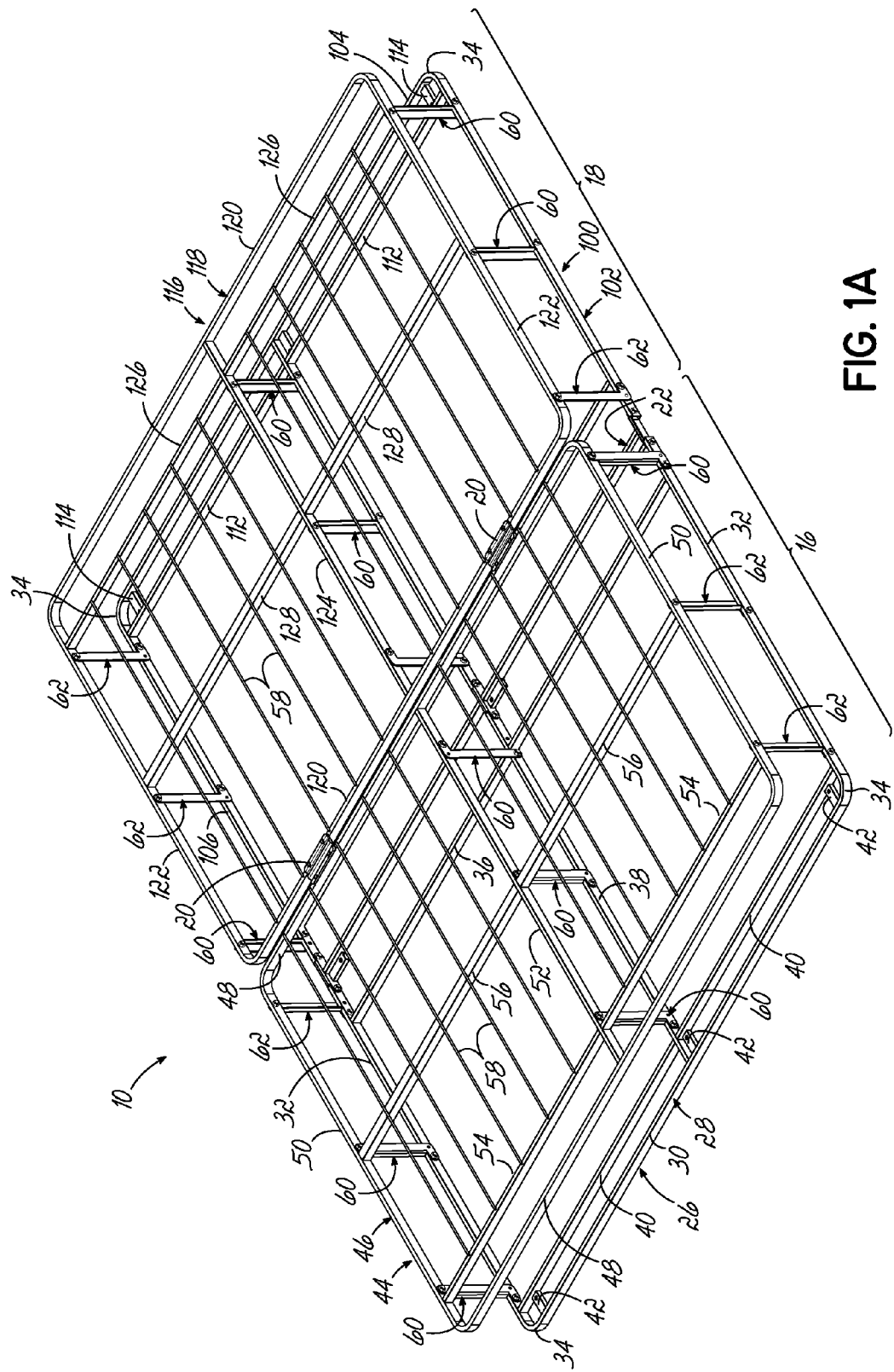
FIG. 1A is a perspective view of the collapsible bedding foundation of FIG. 1 without any covering.
Figure 2:
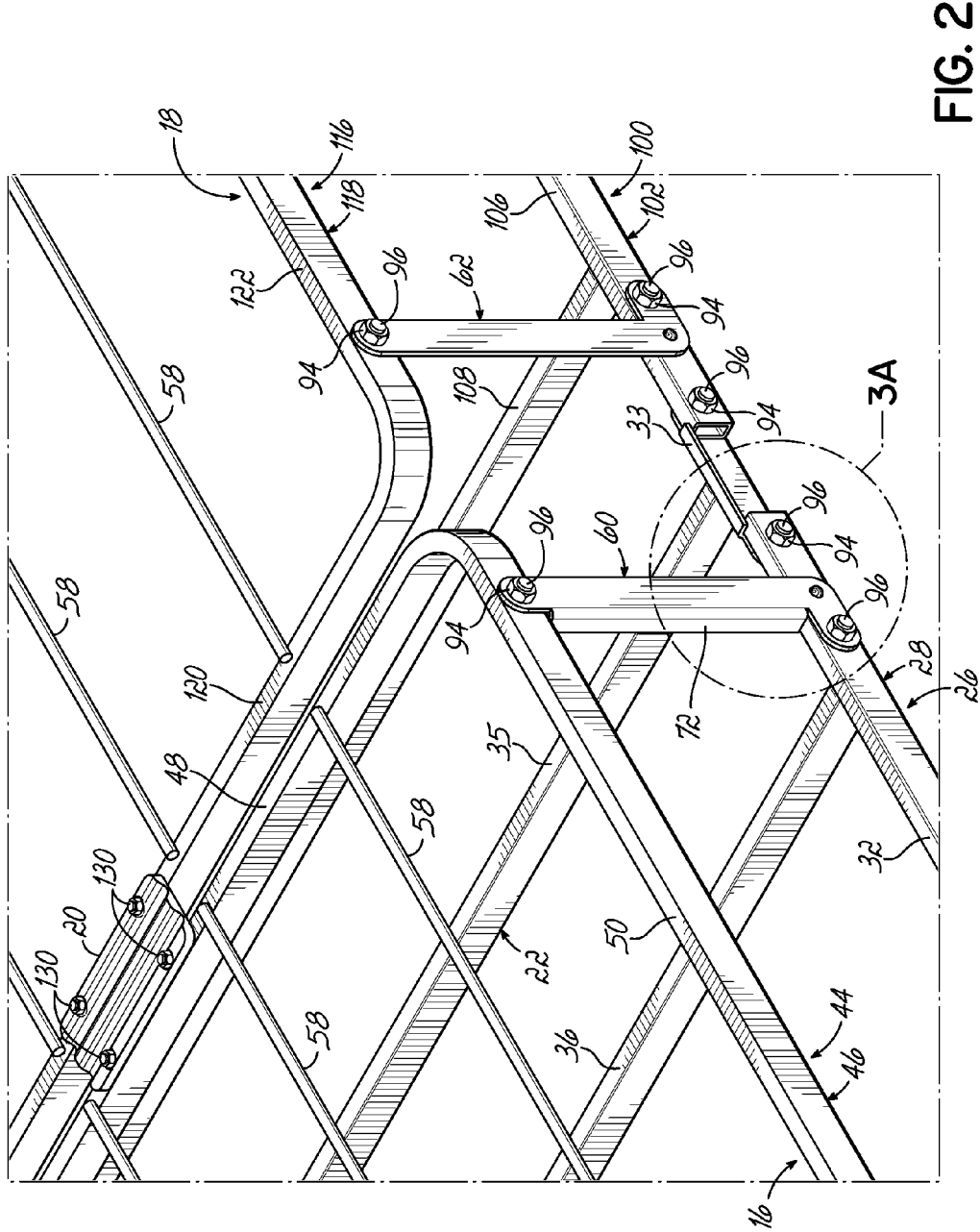
FIG. 2 is an enlarged perspective view of a portion of the collapsible bedding foundation of FIG. 1.

Referring to FIGS. 1A and 2, the first section 16 comprises a first base 26 comprising a generally U-shaped member 28 made of rectangular tubing as defined hereinabove. The hollow generally U-shaped perimeter member 28 comprises an end member 30 and a pair of opposed parallel sides 32 joined together with corner members 34. Although the generally U-shaped perimeter member 28 is shown comprising multiple members joined together, the generally U-shaped perimeter member 28 may be made of a single piece of rectangular tubing. The base 26 further comprises two transversely extending cross members 36 made of rectangular tubing. Each cross member 36 extends between and is secured to the one of the sides 32 of the generally U-shaped perimeter base member 28 and a middle base member 38. The base 26 further comprises a longitudinally extending middle base member 38 secured to and extending between the lower hinge assembly 22 and the end member 30 of the generally U-shaped perimeter base member 28. The middle base member 38 is made of rectangular tubing. The base 26 further comprises two stability members 40, each stability member 40 extending between the middle member 38 and one of the sides 32 of the generally U-shaped perimeter base member 28, and being spaced from the end member 30 of the generally U-shaped perimeter base member 28 with at least one stabilizer 42.

As shown in FIGS. 1 and 1A, the first section 16 of the collapsible bedding foundation 10 further comprises a first upper deck 44 comprising a first perimeter deck member 46 made of rectangular tubing. The first perimeter deck member 46 has two ends 48 and two sides 50. Although the generally rectangular perimeter deck member 46 is shown comprising multiple members joined together, the generally rectangular perimeter deck member 46 may be made of any number of pieces, including a single piece of rectangular tubing.

The first upper deck 44 further comprises a longitudinally extending middle member 52 secured to and extending between the ends 48 of the first perimeter deck member 46. The middle member 52 is made of rectangular tubing. The first upper deck 44 further comprises two end cross members 54, and two middle cross members 56, each being made of rectangular tubing. Each cross member 54, 56 extends between the middle member 52 and one of the sides 50 of the first perimeter deck member 46. As best shown in FIG. 2, the first upper deck 44 further comprises a plurality of spaced, parallel longitudinally extending deck wires 58 secured to one end 48 of the first perimeter deck member 46 (closest the hinges) and one of the end cross members 54 by welding. The longitudinally extending deck wires 58 are further secured to the middle cross members 56 at their intersections.

Figure 5B:
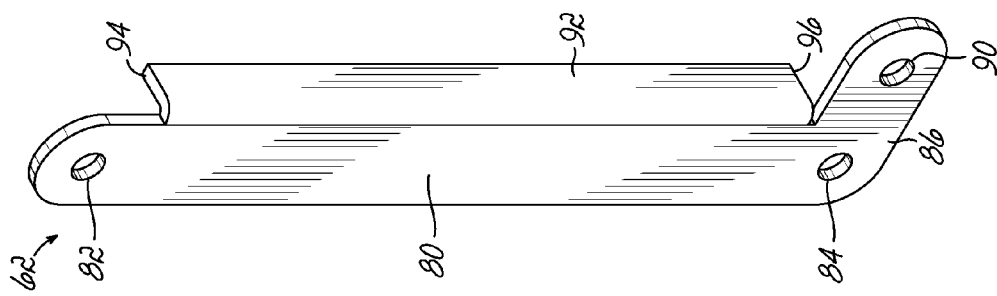
FIG. 5B is a perspective view of one of the right-hand spacers.
Figure 5A:
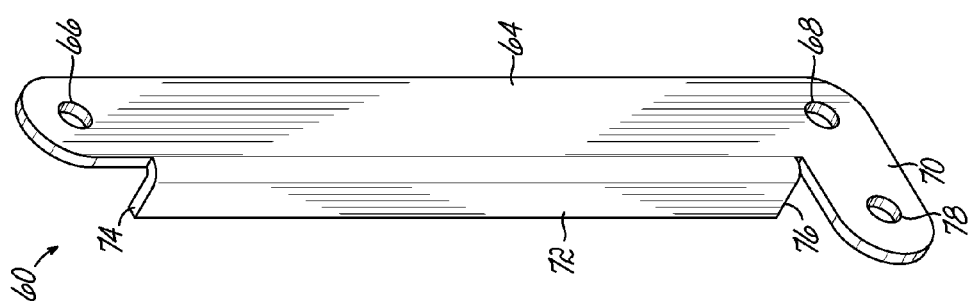
FIG. 5A is a perspective view of one of the left-hand spacers.

As best seen in FIGS. 5A and 5B, each of the first and second sections 16, 18 of the collapsible bedding foundation 10 further comprises multiple L-shaped spacers 60, 62. Each L-shaped spacer 60, 62 is pivotally connected to the first base 26 and the first upper deck 44.

FIG. 5A illustrates a left-hand spacer 60. Each left-hand spacer 60 is made of one piece of metal and comprises a generally planar body portion 64 having an opening 66 in the form of a hole at the top thereof and an opening 68 in the form of a hole at the bottom thereof. The left-hand spacer 60 further comprises a leg 70 at the bottom thereof integral with the body portion 64, the leg 70 being co-planar with the body portion 64. The leg 70 has an opening 78 in the form of a hole therein. The left-hand spacer 60 further comprises a flange 72 integral with the body portion 64. The flange 72 has an upper edge 74 and a lower edge 76. As shown in FIG. 5A, leg 70 extends generally perpendicular to the body portion 64, but in the same plane. Flange 72 extends generally perpendicular to the plane of the body portion 64 and leg 70.

FIG. 5B illustrates a right-hand spacer 62. Each right-hand spacer 62 is made of one piece of metal and comprises a generally planar body portion 80 having an opening 82 in the form of a hole at the top thereof and an opening 84 in the form of a hole at the bottom thereof. The right-hand spacer 62 further comprises a leg 86 at the bottom thereof integral with the body portion 80, the leg 86 being co-planar with the body portion 80. The leg 86 has an opening 90 in the form of a hole therein. The right-hand spacer 62 further comprises a flange 92 integral with the body portion 80. The flange 92 has an upper edge 94 and a lower edge 96. As shown in FIG. 5B, leg 86 extends generally perpendicular to the body portion 80, but in the same plane. Flange 92 extends generally perpendicular to the plane of the body portion 80 and leg 86.

As best seen in FIG. 1A, a column of spacers, two left-hand spacers 60 and one right-hand spacer 62, are pivotally connected to the far side 32 of the generally U-shaped perimeter member 28 of first base 26 and the far side 50 of the perimeter member 46 of the first deck 44. Additionally, another column of spacers, two right-hand spacers 62 and one left-hand spacer 60, are pivotally connected to the near side 32 of the generally U-shaped perimeter member 28 of first base 26 and the near side 50 of the perimeter member 46 of the first deck 44. Lastly, a third column of spacers, three left-hand spacers 60, are pivotally connected to the middle member 38 of the first base 26 and the middle member 52 of the first deck 44.

Figure 3A:
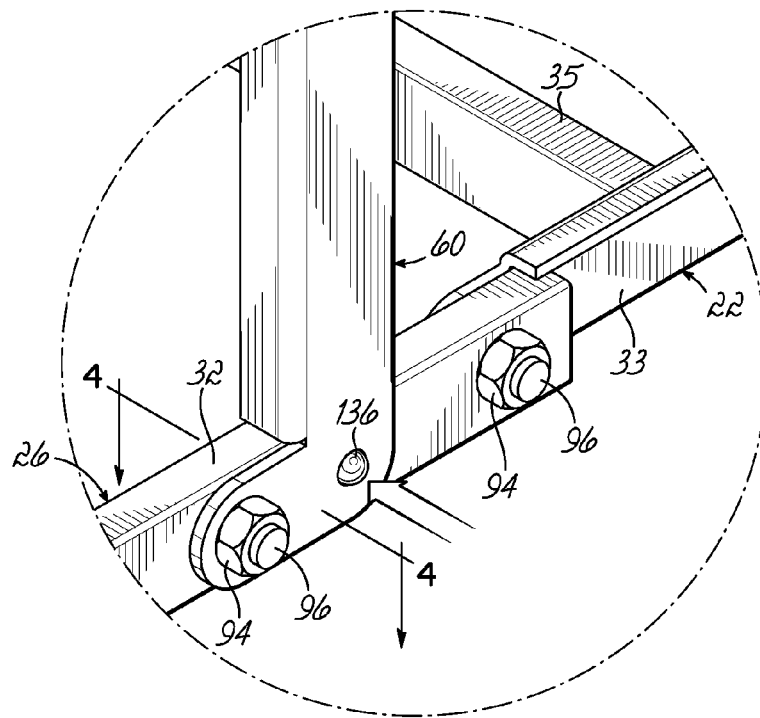
FIG. 3A is an enlarged perspective view of the encircled area 3A of FIG. 2.
Figure 3B:
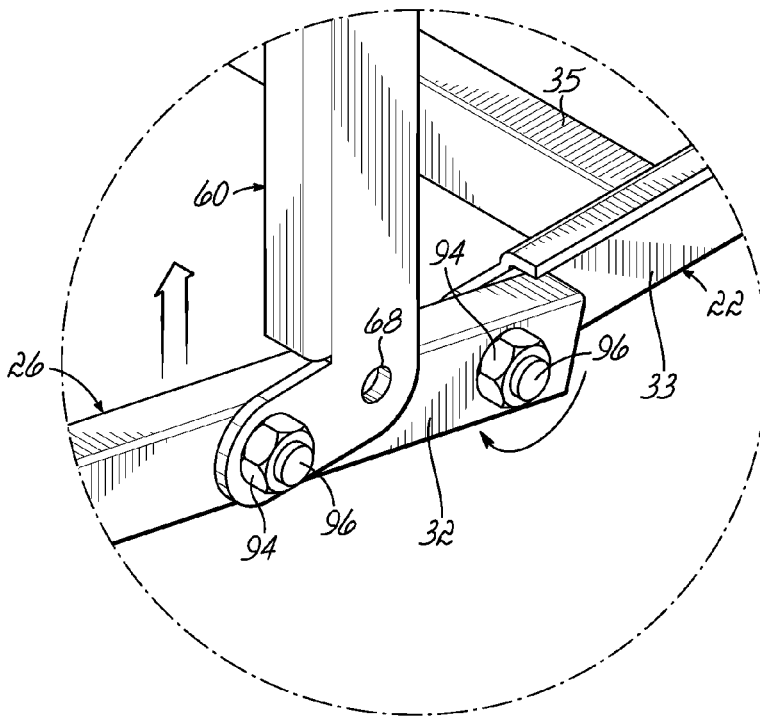
FIG. 3B is an enlarged perspective view like FIG. 3A illustrating one of the spring clips being compressed and the foundation collapsed.
Figure 4:
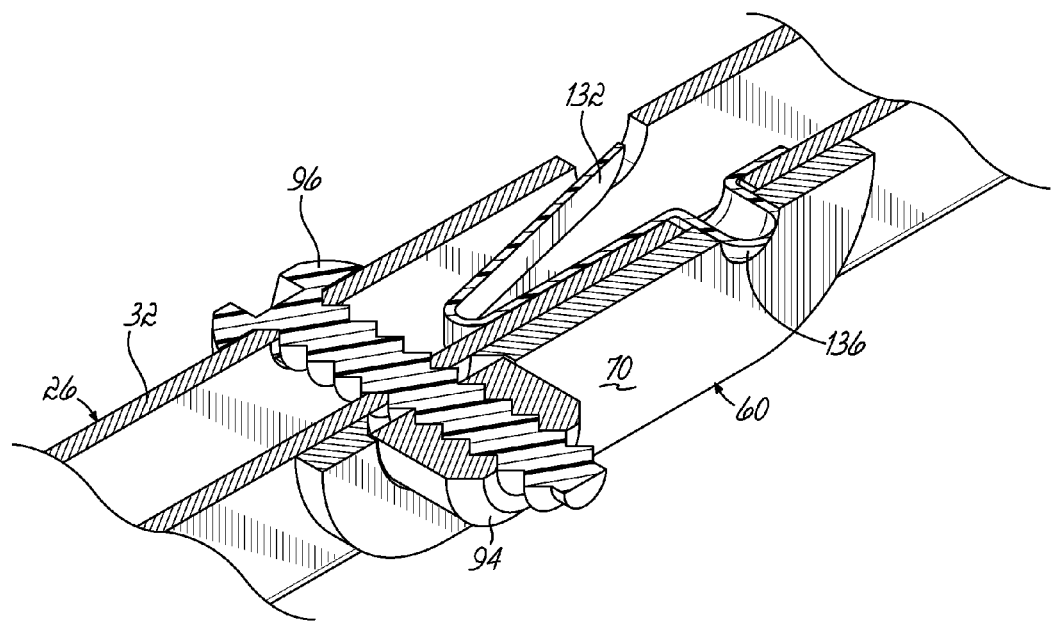
FIG. 4 is a cross-sectional view taken along the line 4-4 of FIG. 3A.
Figure 4A:
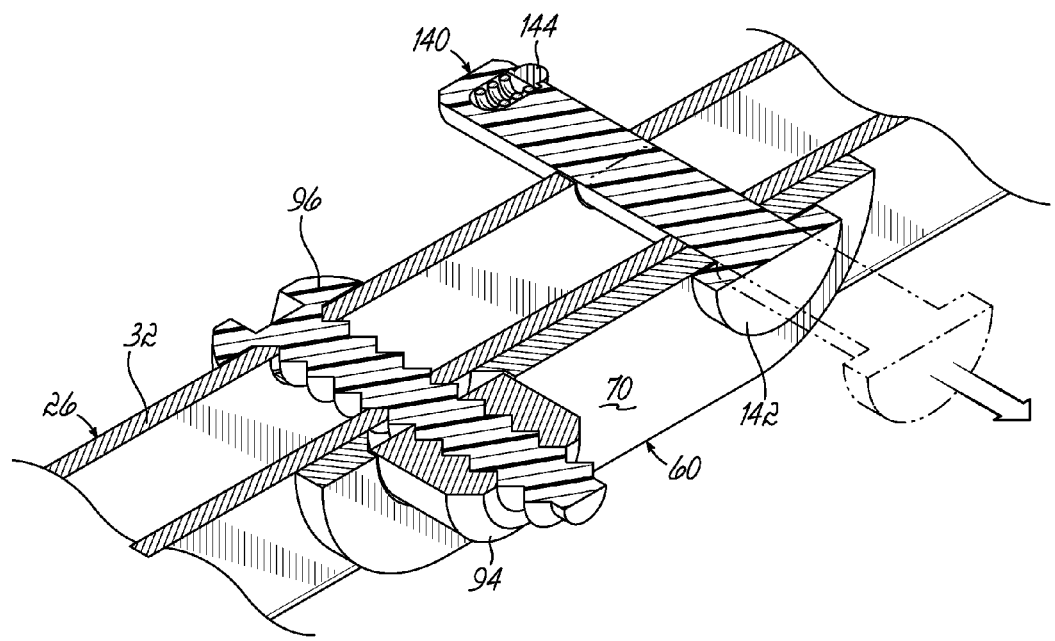
FIG. 4A is a cross-sectional view like FIG. 4 illustrating another embodiment.

More specifically, as shown in FIGS. 2, 3A and 3B, a threaded bolt 96 passes through the upper opening 66 in one of the left-hand spacers 60 and through openings in the rectangular tubing of either the perimeter member 46 or the middle member 52 of the first deck 44. As best shown in FIGS. 4 and 4A, the threaded bolt 96 is secured in place by a threaded nut 94, as is known in the art. The fastener, bolt 96 and nut 94, pivotally secures the left-hand spacer 60 to the first upper deck 44. Another bolt 96 passes through the opening 68 in the leg 70 of one of the left-hand spacers 60 and through openings in the rectangular tubing of either the U-shaped perimeter member 28 or the middle member 38 of the first base 26 and is secured by a threaded nut 94. The bolt 96 and nut 94 (fastener) pivotally secures the left-hand spacer 60 to the first base 26.

Similarly, for each of the three right-hand spacers 62 used in the first section 16 of the foundation 10, a bolt 96 passes through the upper opening 82 in one of the right-hand spacers 62 and through openings in the rectangular tubing of the perimeter member 46 of the first deck 44 and is secured by a threaded nut 94, as is known in the art. The fastener, bolt 96 and nut 94, pivotally secures the right-hand spacer 62 to the first upper deck 44. Another bolt 96 passes through the opening 90 in the leg 86 of one of the right-hand spacers 62 and through openings in the rectangular tubing of the U-shaped member 28 of the first base 26 and is secured by a threaded nut 94. The bolt 96 and nut 94 (fastener) pivotally secures the right-hand spacer 62 to the first base 26. Thus, each of the spacers, right-handed or left-handed, remains connected to the first base 26 and first upper deck 44 regardless of whether the foundation is erected or collapsed.

As best shown in FIG. 1A, the second section 18 of the bedding foundation 10 comprises a second base 100 comprising a generally U-shaped perimeter member 102 made of rectangular tubing. The hollow generally U-shaped perimeter member 102 comprises an end member 104 and a pair of opposed parallel sides 106 joined together with corner members 34. Although the generally U-shaped perimeter member 102 is shown comprising multiple members joined together, the generally U-shaped member 102 may be made of any number of pieces, including a single piece of rectangular tubing. The second base 100 further comprises transversely extending cross members 108, each cross member 108 being made of rectangular tubing and extending between and secured to one of the sides 106 of the generally U-shaped base member 102 and the middle base member 110. The second base 100 further comprises a longitudinally extending middle member 110 secured to and extending between the lower hinge assembly 22 and the end member 104 of the generally U-shaped second base member 102. The middle member 110 is made of rectangular tubing. The second base 100 further comprises two stability members 112, each stability member 112 extending between the middle member 110 and one of the sides 106 of the generally U-shaped second base member 102 and being spaced from the end member 104 of the generally U-shaped second base member 102 with at least one stabilizer 114.

As shown in FIGS. 1A and 2, the second section 18 of the collapsible bedding foundation 10 further comprises a second upper deck 116 comprising a second perimeter deck member 118 made of rectangular tubing. The second perimeter deck member 118 has two ends 120 and two sides 122. Although the second generally rectangular perimeter deck member 118 of the second section 18 is shown comprising multiple members joined together, the generally rectangular perimeter deck member 118 of the second section 18 may be made of a single piece of rectangular tubing.

The second upper deck 116 further comprises a longitudinally extending middle member 124 secured to and extending between the ends 120 of the second perimeter deck member 118. The middle member 124 is made of rectangular tubing. The second upper deck 116 further comprises two end cross members 126 and two middle cross members 128. Each cross member 126, 128 extends between the middle member 124 and one of the sides 122 of the second perimeter deck member 118. As best shown in FIG. 2, the second upper deck 116 further comprises a plurality of spaced, parallel longitudinally extending deck wires 58 secured to one end 120 of the second perimeter deck member 118 (closest the hinges) and one of the end cross members 126 by welding. The longitudinally extending deck wires 58 are further secured to the middle cross members 128.

Figure 1B:
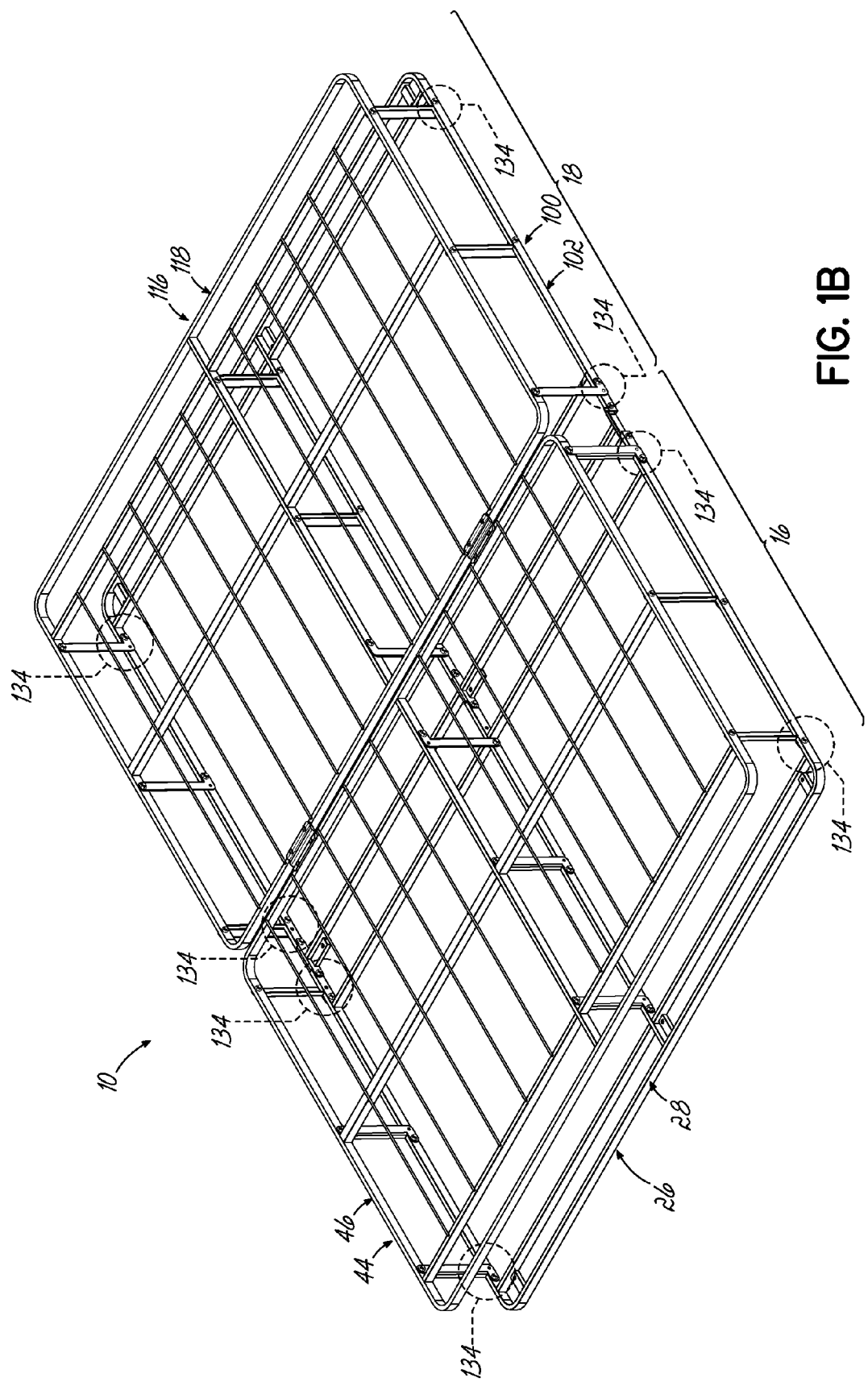
FIG. 1B is a perspective view of the collapsible bedding foundation of FIG. 1A showing the locations of the locking mechanisms.
Figure 1C:
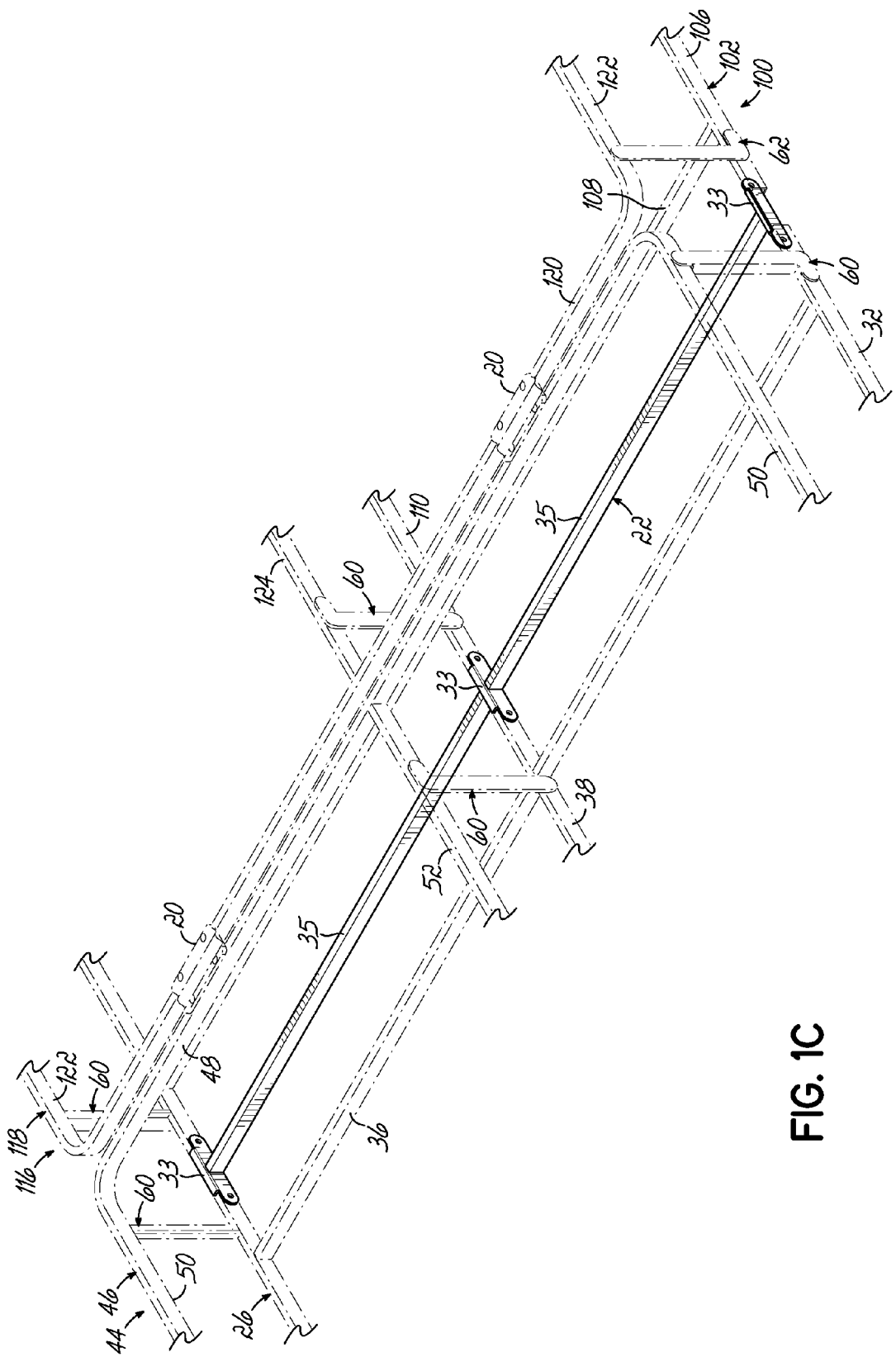
FIG. 1C is a perspective view of a portion of the collapsible bedding foundation of FIG. 1 without any covering illustrating the lower hinge assembly.

As best illustrated in FIGS. 1A and 1C, the first and second sections 16, 18 of the bedding foundation 10 are connected to each other with two upper hinges 20 and a lower hinge assembly 22. Each upper hinge 20 connects the first upper deck 44 to the second upper deck 116 and, more particularly, connects the perimeter member 46 of the first upper deck 44 to the perimeter member 118 of the second upper deck 116. In one embodiment, illustrated in FIG. 2, each upper hinge 20 is secured onto the perimeter members 46, 118 of the first and second upper decks 44, 116, respectively, with fasteners 130. Each upper hinge 20 functions to space the first upper deck 44 from the second upper deck 116 and is preferably made of plastic, but may be made of any other suitable material. In accordance with the present invention, each upper hinge may assume other configurations and be made of any suitable material. Although two upper hinges 20 are illustrated, any number of upper hinges, including a single hinge, may be used.

As best seen in FIG. 1C, the lower hinge assembly 22 connects the first base 26 to the second base 100. More particularly, the lower hinge assembly 22 connects the sides 32 of the generally U-shaped perimeter member 28 of the first base 26 to the sides 106 of the generally U-shaped perimeter member 102 of the second base 100 along with connecting the middle members 38, 110 of the first and second bases, respectively. As best shown in FIGS. 1C and 2, the lower hinge assembly 22 is a unitary metal member comprising three linear hinges 33 connected with two straight connectors 35. As best illustrated in FIG. 2, each of the linear hinges 33 is hingedly secured to and extends between the first and second bases 26, 100, respectively, with nuts 94 and bolts 96. Other means of securing the lower hinge assembly 22 to the bases 26, 100 may be used if desired. The lower hinge assembly may assume other configurations and be made of any suitable material.

As best seen in FIG. 1A, a column of spacers, one left-hand spacer 60 and two right-hand spacers 62, are pivotally connected to the far side 106 of the generally U-shaped member 102 of second base 100 and the far side 122 of the perimeter member 118 of the second upper deck 116. Additionally, another column of spacers, one right-hand spacer 62 and two left-hand spacers 60, are pivotally connected to the near side 106 of the generally U-shaped member 102 of second base 100 and the near side 122 of the perimeter member 118 of the second upper deck 116. Lastly, a third column of spacers, three left-hand spacers 60, are pivotally connected to the middle member 110 of the second base 100 and the middle member 124 of the second upper deck 116.

As best shown in FIG. 2, the flanges 72, 92 of the left-hand spacers 60 and right hand spacers 62, respectively, function to support the upper decks 44, 116 when the foundation 10 is erected. They further function to prevent the collapse of the upper decks relative to the bases of the two sections.

FIGS. 3A, 3B and 4 illustrate one locking mechanism to maintain the foundation 10 in an erected position or condition. As best shown in FIG. 4, locking members in the form of spring clips 132 may be located inside the hollow interior of the sides 32, 106 of the generally U-shaped perimeter members 28, 102, respectively, of the first and second bases 26, 100. The location of the spring clips 132 is shown by the eight encircled areas 134 shown in FIG. 1B (four per section). As shown in FIGS. 3A and 4, each spring clip 132 has a push pin portion 136 which is adapted to fit through one of the openings 68 in a left-hand spacer 60 and/or one of the openings 84 in a right-hand spacer 62. See FIGS. 5A and 5B. As shown in FIGS. 3A and 3B, the push pin portion 136 of each of the four locking members or spring clips 132 per section must be depressed in order to rotate a section relative to the lower hinge assembly 22. The lower hinge assembly 22 remains stationary during the collapsing process.

Figure 7:
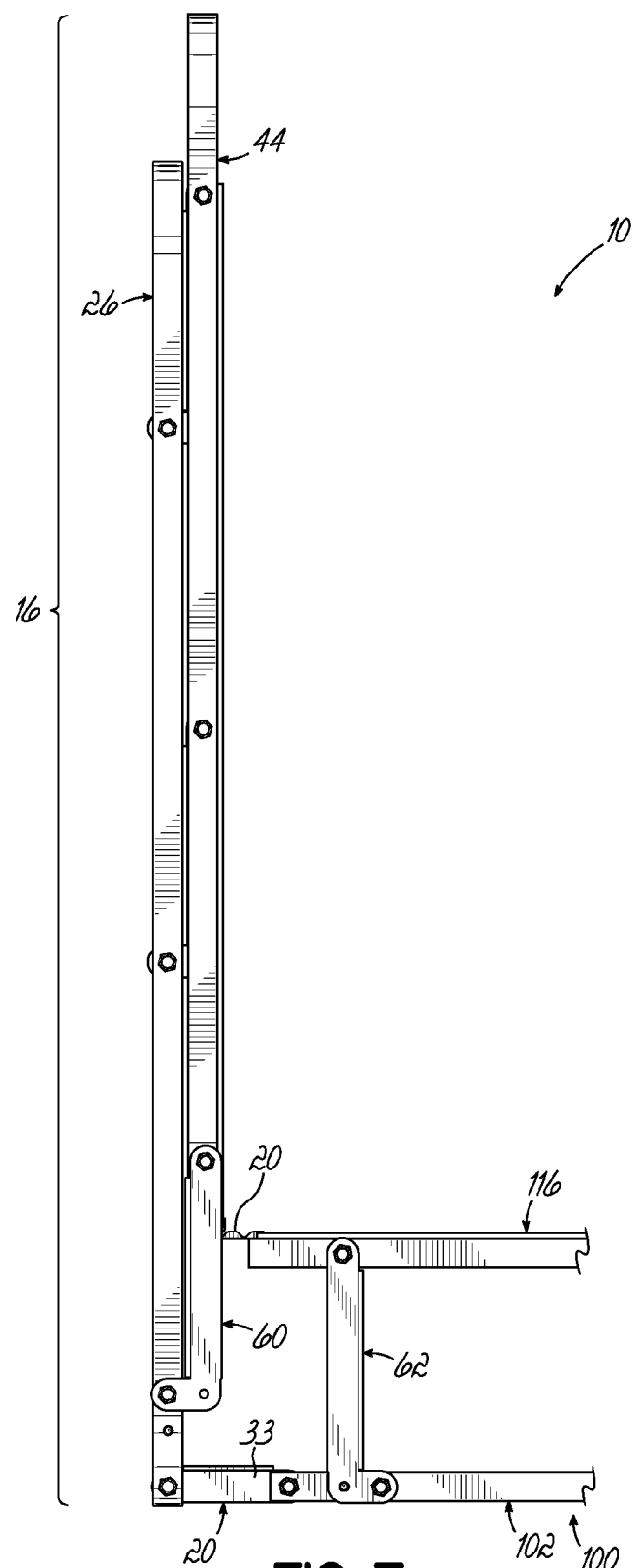
FIG. 7 is a side elevational view of a portion of the bedding foundation of FIG. 1A being partially collapsed.
Figure 8:
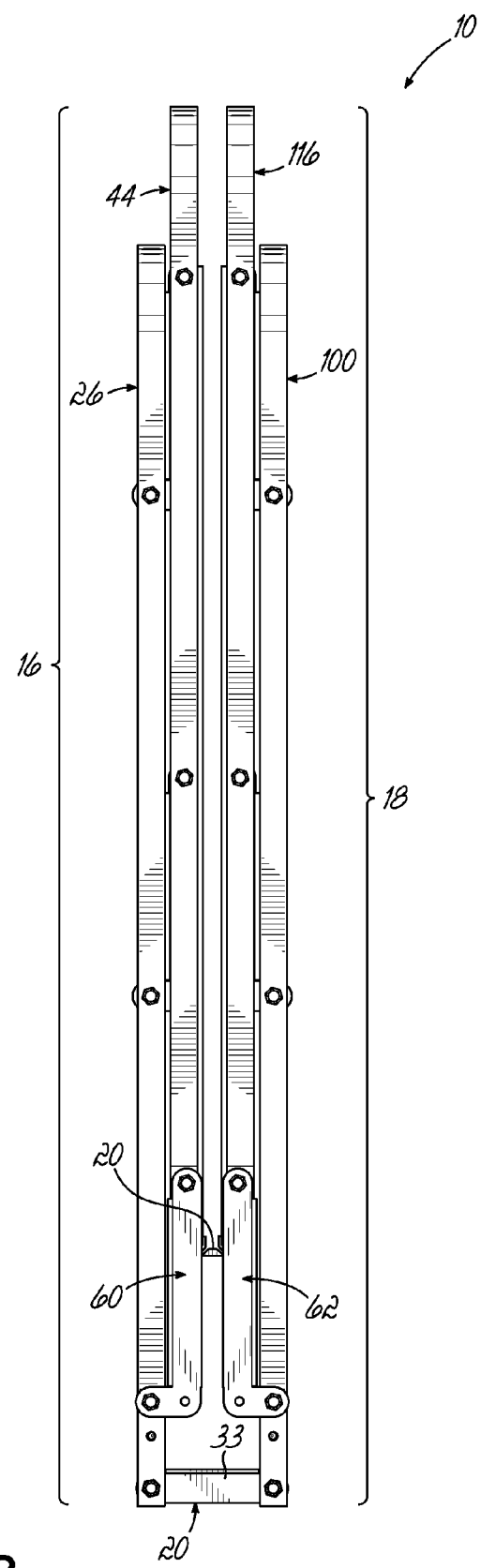
FIG. 8 is a side elevational view of the bedding foundation of FIG. 1A being fully collapsed.

FIG. 6 illustrates the first section 16 being moved upwardly in the direction of arrows 138 to raise the first section 16 relative to the second section 18 and partially collapse the foundation 10. FIG. 7 illustrates the first section 16 being fully collapsed. FIG. 8 illustrates the first and second sections 16, 18 being fully collapsed.

FIG. 4A illustrates another type of locking member which may be used in place of spring clips 132. In this embodiment, a removable locking pin 140 having a head 142 and a spring loaded stopper 144 may be used in each of the eight encircled areas 134 of FIG. 1B. To collapse the foundation 10, each of the locking pins 140 must be removed.

FIGS. 9-14D illustrate an alternative embodiment of collapsible bedding foundation 10a, which has four hinged sections. The collapsible bedding foundation 10a has a pair of end surfaces 12a defining a length or longitudinal dimension La of the foundation 10a and a pair of opposed side surfaces 14a defining a width Wa of the foundation 10a.

Figure 9:
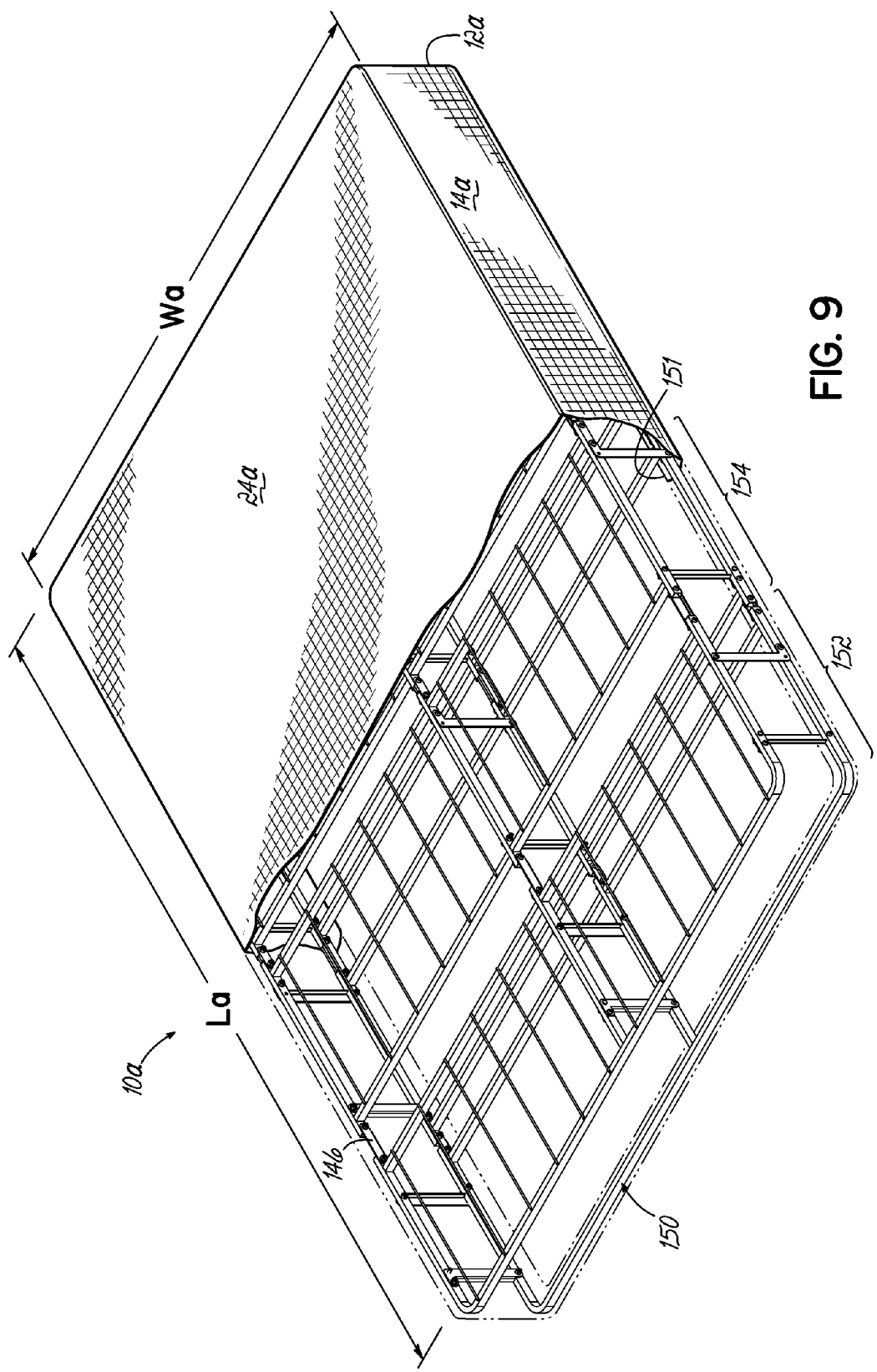
FIG. 9 is a perspective view of another embodiment of collapsible bedding foundation in an erected condition with a removable cover.
Figure 9A:
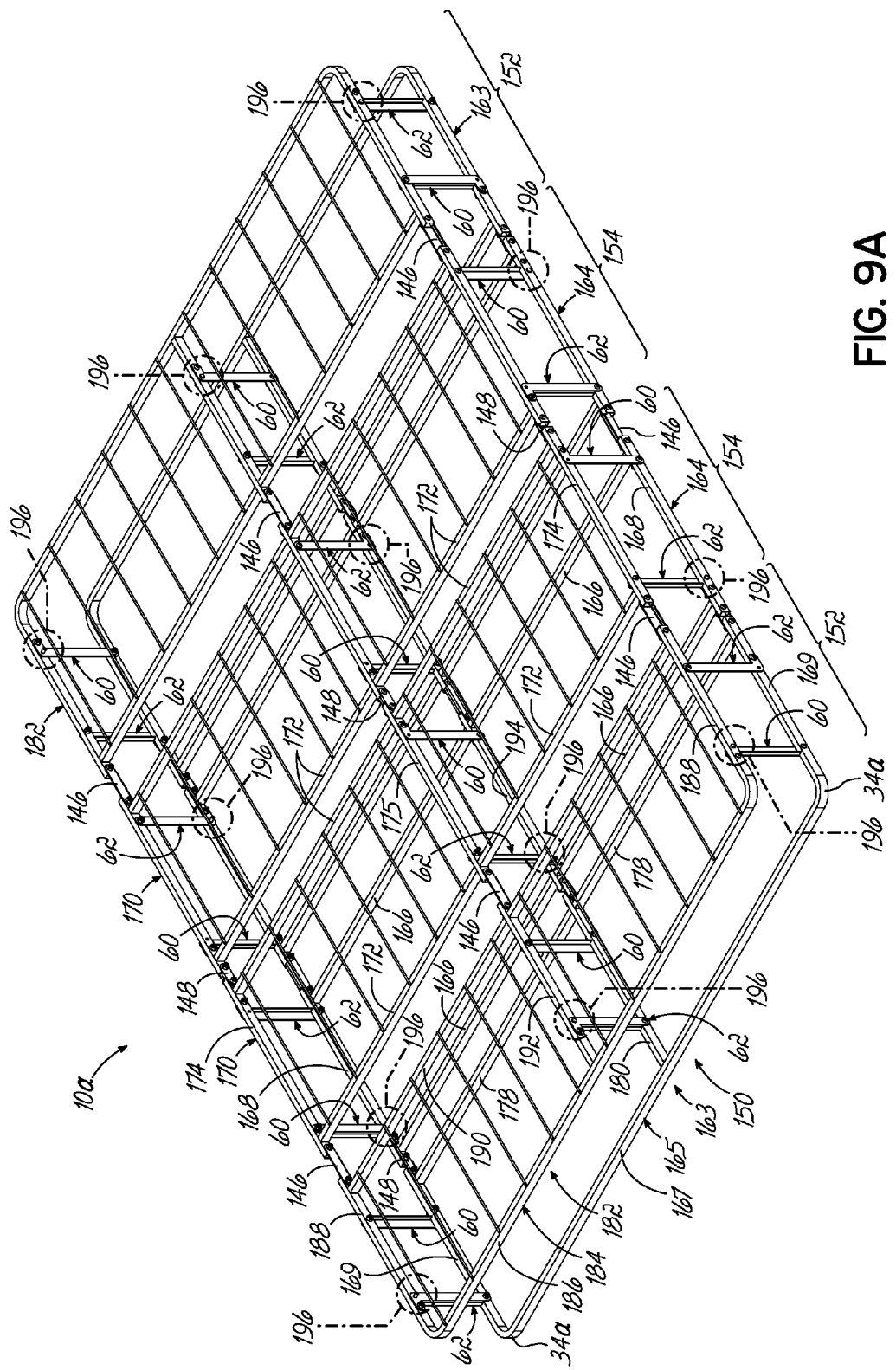
FIG. 9A is a perspective view of the collapsible bedding foundation of FIG. 9 without any covering.

The bedding foundation 10a comprises a core 150 shown in detail in FIG. 9A comprising two end sections 152 and two middle sections 154 hinged together. The hinges 146, 148 enable the bedding foundation 10a to move from an erected position shown in FIGS. 9 and 9A to a collapsed position shown in FIG. 14D. Although the drawings (except FIG. 9) illustrate this embodiment of bedding foundation 10a with no cover, the bedding foundation 10a may be collapsed with a removable cover 24a as partially shown in FIG. 9. If desired, padding (not shown) may be placed on an upper surface of the bedding product 10a before the cover 24a is attached. The cover 24a is illustrated having an elastic band 151 at the bottom thereof. However, any removable cover, including the zippered cover 24 illustrated in FIG. 1, may be used.

The core 150 of bedding foundation 10a has each end section 152 hinged to a middle section 154 with multiple long and short hinges 146, 148, respectively. Similarly, the two middle sections 154 are hinged together with multiple long and short hinges 146, 148, respectively.

Figure 10:
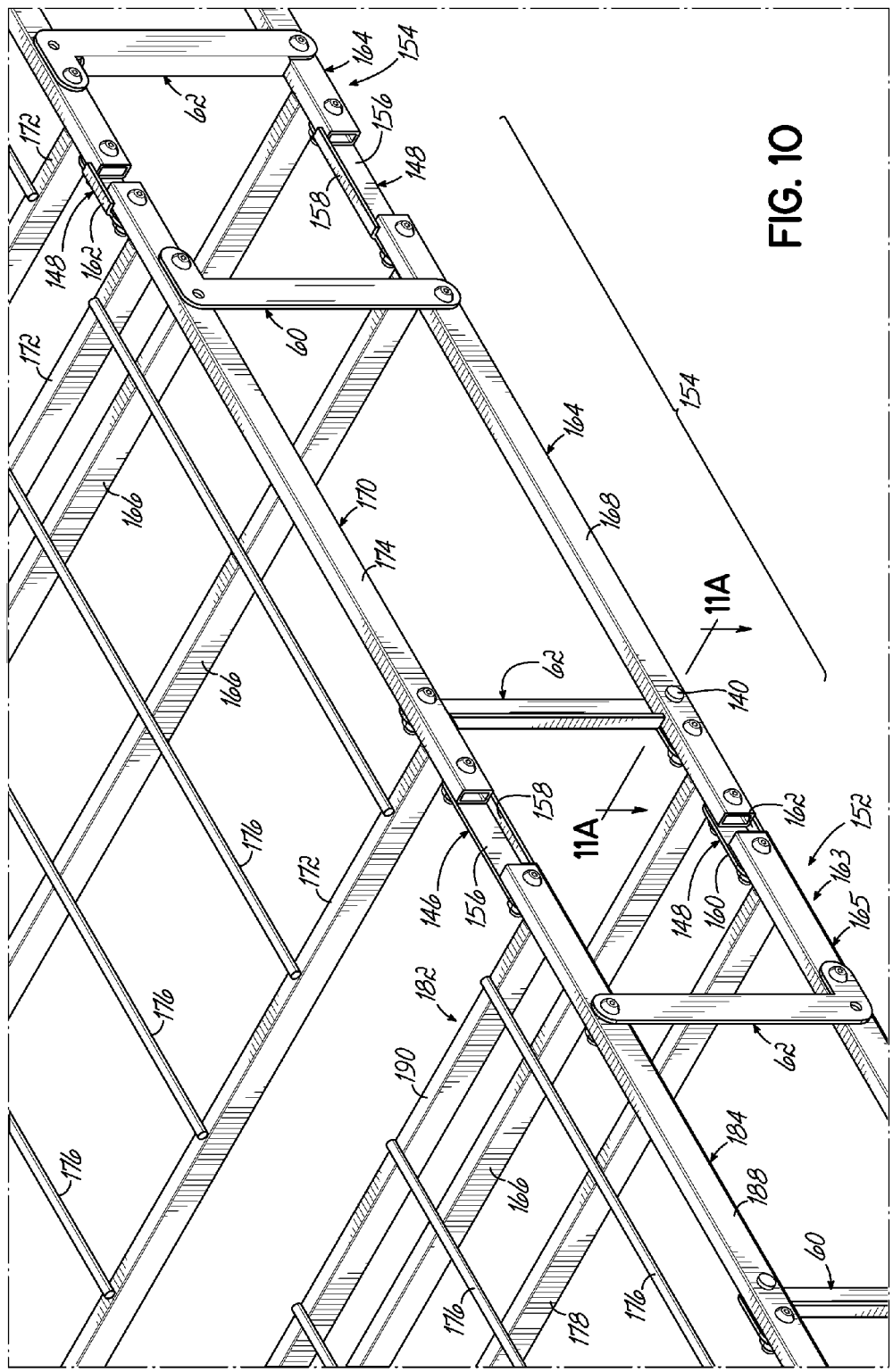
FIG. 10 is an enlarged perspective view of a portion of the collapsible bedding foundation of FIG. 9A.

As best shown in FIG. 10, each long hinge 146 is the same size, and each short hinge 148 is the same size. However, the long hinges 146 are greater in length than the short hinges 148. As best shown in FIG. 10, each long hinge 146 has a generally planar body portion 156 and a flange 158 extending generally perpendicular to the body portion 156. Each short hinge 148 has a generally planar body portion 160 and a flange 162 extending generally perpendicular to the body portion 160. The hinges 146, 148 enable the core 150 of bedding foundation 10a to move from an erected position shown in FIG. 9A to a fully collapsed position shown in FIG. 14D.

As best shown in FIGS. 9A and 10, each end section 152 is hingedly secured to its adjacent middle section 154 with three upper long hinges 146 and three lower short hinges 148. When the foundation 10a is fully erect, as shown in FIG. 9A, each short hinge 148 is below one of the long hinges 146 at the juncture of an end section 152 and a middle section 154. As best shown in FIG. 10, the two middle sections 154 are hingedly secured together with three upper short hinges 148 and three long short hinges 146. When the foundation 10*a* is fully erect, as shown in FIG. 9A, each short hinge 148 is above one of the long hinges 146 at the juncture of the middle sections 154.

Referring to FIG. 9A, each end section 152 comprises a base 163 comprising a generally U-shaped member 165 made of rectangular tubing as defined hereinabove. The hollow generally U-shaped member 165 comprises an end member 167 and a pair of opposed parallel sides 169 joined together with corner members 34*a*. Although the generally U-shaped member 165 is shown comprising multiple members joined together, the generally U-shaped member 165 may be made of a single piece of rectangular tubing. The base 163 further comprises two transversely extending cross members 178, each being made of rectangular tubing. Each cross member 178 extends between, and is secured to, one of the sides 169 of the generally U-shaped base member 165 and a longitudinally extending middle member 180. The middle member 180 is secured to and extends between the hinge 148 and the end member 167 of the generally U-shaped base 163. The base middle member 180 is made of rectangular tubing.

As shown in FIGS. 9 and 9A, each end section 152 of the core 150 of the collapsible bedding foundation 10*a* further comprises an upper deck 182 comprising a generally U-shaped deck member 184 made of rectangular tubing. The generally U-shaped deck member 184 has one end 186 and two sides 188. Although the generally U-shaped deck member 184 is shown comprising multiple members joined together, the generally rectangular U-shaped deck member 184 may be made of a single piece of rectangular tubing. The upper deck 182 further comprises two transversely extending cross members 190, each being made of rectangular tubing. Each cross member 190 extends between, and is secured to, one of the sides 188 of the generally U-shaped deck member 184.

The upper deck 182 further comprises a longitudinally extending middle member 192 secured to and extending between the end 186 of the generally U-shaped deck member 184 and the transversely extending cross member 190. The middle member 192 is made of rectangular tubing. As best shown in FIG. 10, the upper deck 182 further comprises a plurality of spaced, parallel longitudinally extending deck wires 176 secured to end 186 of the generally U-shaped deck member 184 and cross member 190 of upper deck 182 by welding.

Referring to FIG. 9A, each middle section 154 comprises a base 164 comprising a pair of transversely extending cross members 166, each being made of rectangular tubing. The base 164 of each middle section 154 further comprises a pair of longitudinally extending end connecting members 168 and a middle connecting member 194, each being made of rectangular tubing. As best shown in FIG. 10, the three connecting members 168, 194 and cross members 166 of each base 164 of each middle section 154 are welded together.

As shown in FIGS. 9A and 10, each middle section 154 of the core 150 of the collapsible bedding foundation 10*a* further comprises an upper deck 170, a pair of transversely extending cross members 172, each being made of rectangular tubing. The upper deck 170 of each middle section 154 further comprises a pair of longitudinally extending end connecting members 174 and a middle connecting member 175, each being made of rectangular tubing. As best shown in FIG. 10, the connecting members 174, 175 and cross members 172 of each upper deck 170 of each middle section 154 are welded together. The upper deck 170 of each middle section 154 further comprises a plurality of spaced, parallel longitudinally extending deck wires 176 extending between and secured to cross members 172 of upper deck 170 by welding.

Figure 12:
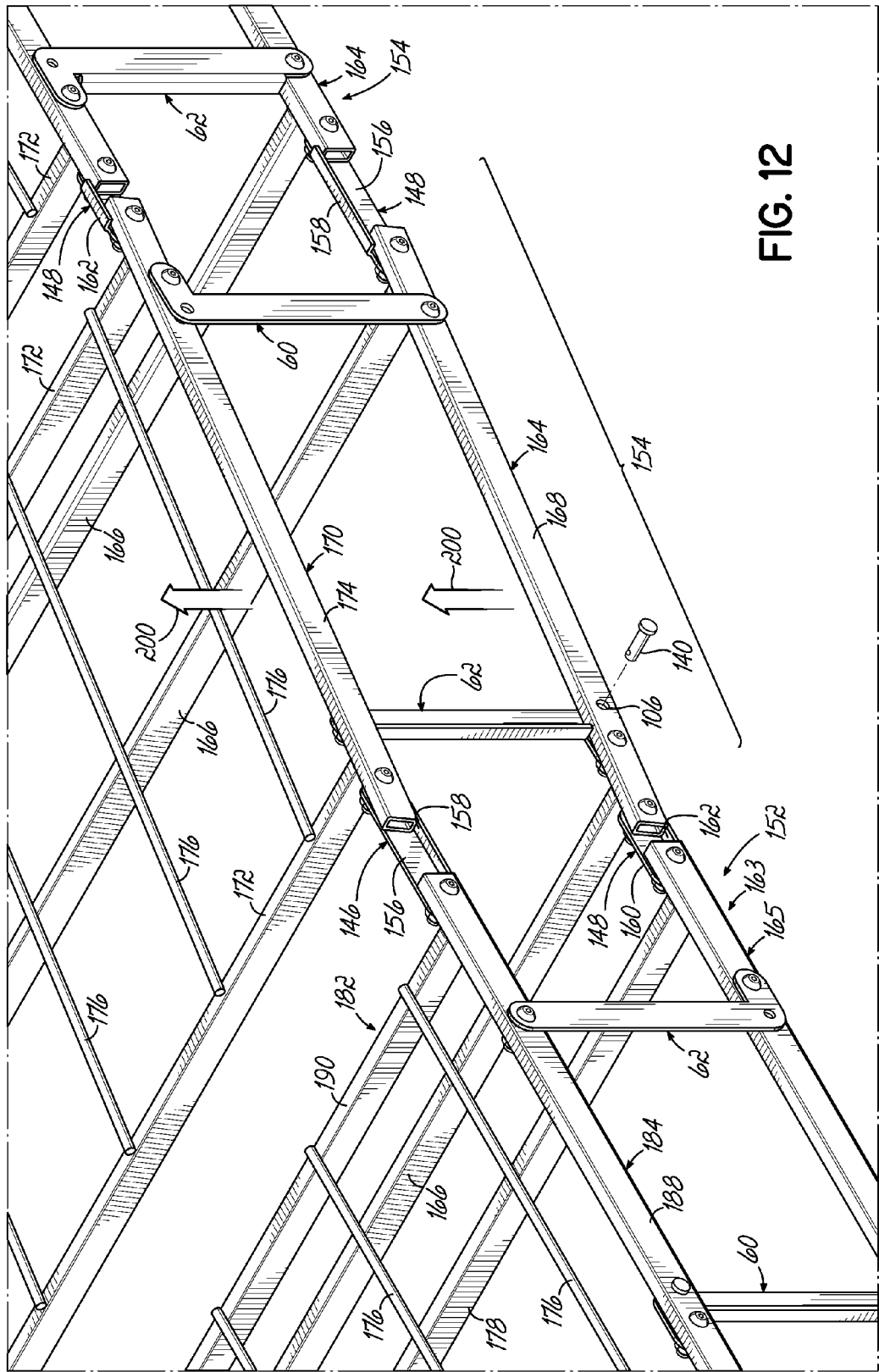
FIG. 12 is an enlarged perspective view of a portion of the collapsible bedding foundation of FIG. 9A showing one of the locking pins being removed.
Figure 13:
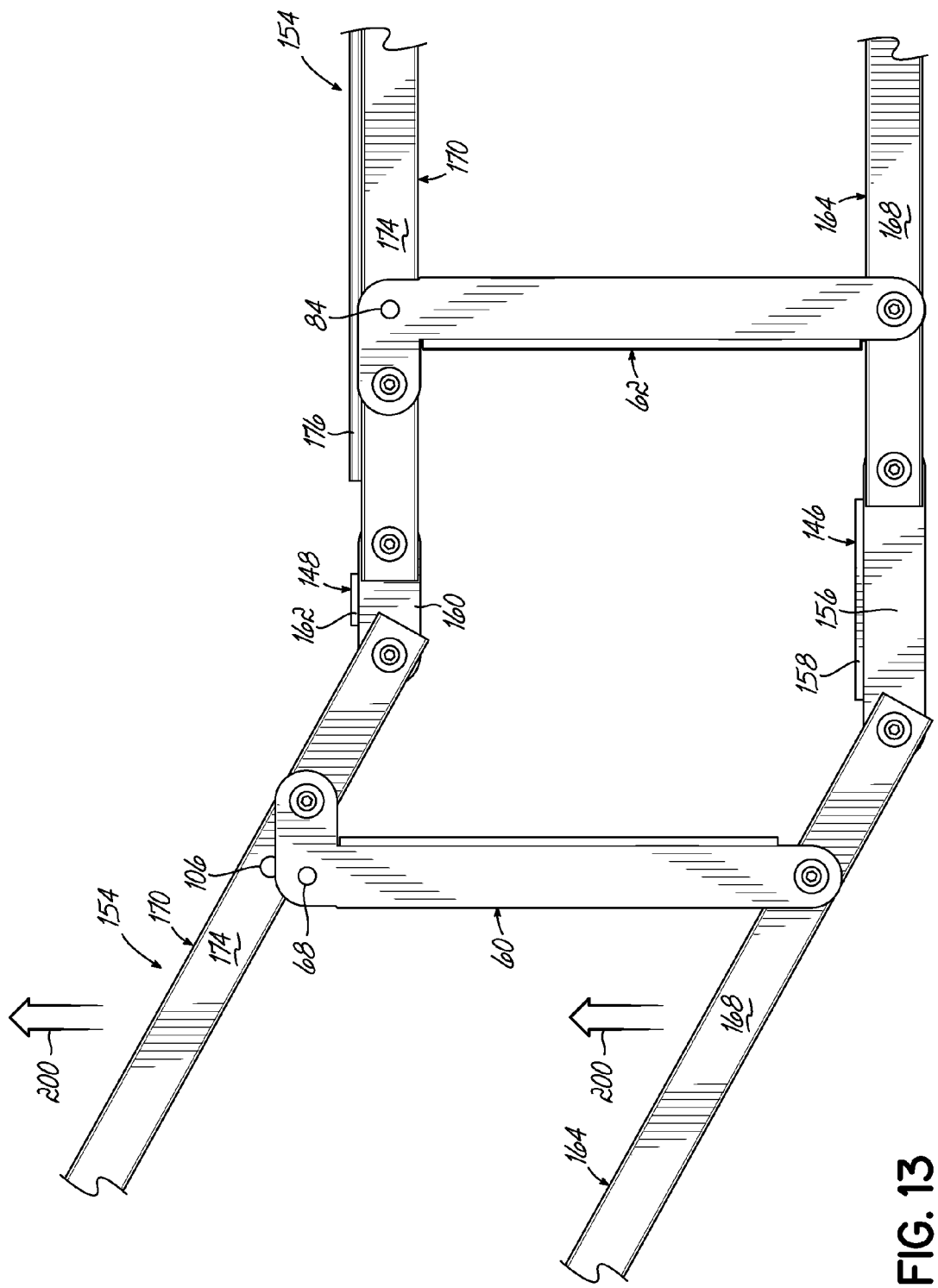
FIG. 13 is a side elevational view of a portion of the bedding foundation of FIG. 9A being collapsed.

As best seen in FIGS. 9A, 10 and 12, each of the end and middle sections 152, 154 of the collapsible bedding foundation 10*a* further comprises multiple L-shaped spacers 60, 62 shown in detail in FIGS. 5A and 5B. Each L-shaped spacer 60, 62 of each end section 152 is pivotally connected to the base 163 and the upper deck 182. As best seen in FIG. 9A, three columns of spacers 60, 62 space the upper deck 182 above the base 163 and lock the foundation in a stationary position when the foundation is in its erected position and the locking members are secured in place.

In each end section 152, a column of spacers (each column having one left-hand spacer 60 and one right-hand spacer 62) are pivotally connected to the far side 169 of the generally U-shaped base member 163 and the far side 188 of the generally U-shaped deck member 184 of the upper deck 182. Additionally, another column of spacers, one right-hand spacer 62 and one left-hand spacer 60, are pivotally connected to the near side 169 of the generally U-shaped base member 163 and the near side 188 of the generally U-shaped deck member 184 of the upper deck 116. Lastly, a third or middle column of spacers, one left-hand spacer 60 and one right-hand spacer 62, are pivotally connected to the middle member 180 of the base 163 and the middle member 192 of the upper deck 182.

Similarly, in each middle section 154, a column of spacers, one left-hand spacer 60 and one right-hand spacer 60, are pivotally connected to each end connecting member 168 of the base 164 and each end connecting member 174 of the upper deck 170. Additionally, a third or middle column of spacers, one left-hand spacer 60 and one right-hand spacer 62, are pivotally connected to the middle connecting member 194 of the base 164 and the middle connecting member 175 of the upper deck 170.

Figure 11A:
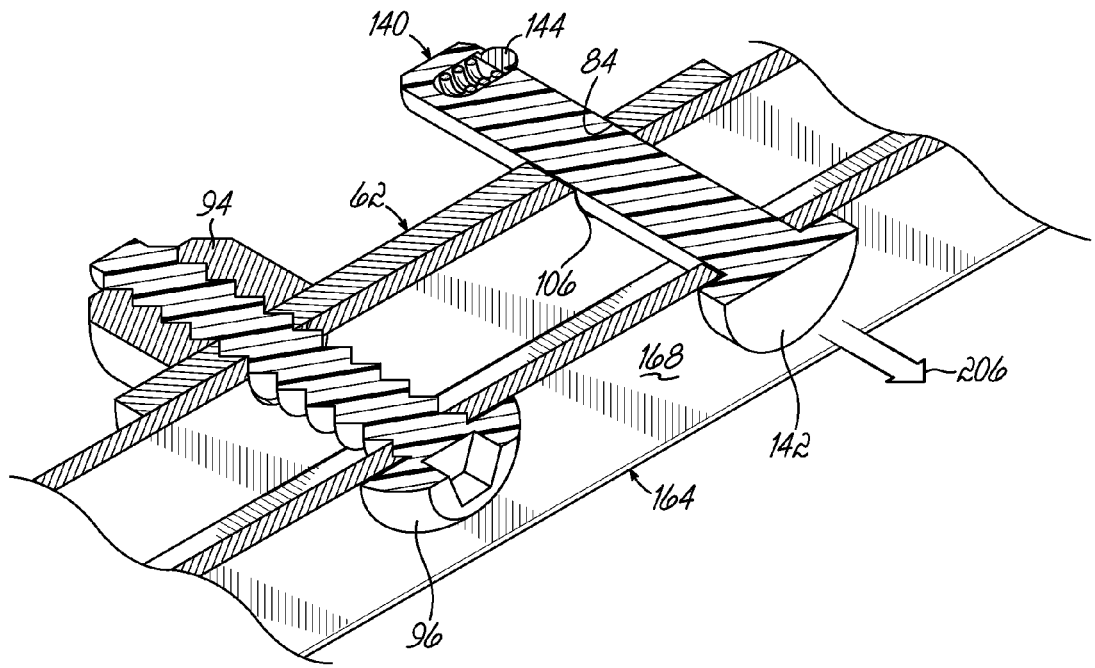
FIG. 11A is a cross-sectional view taken along the line 11A-11A of FIG. 10.
Figure 11B:
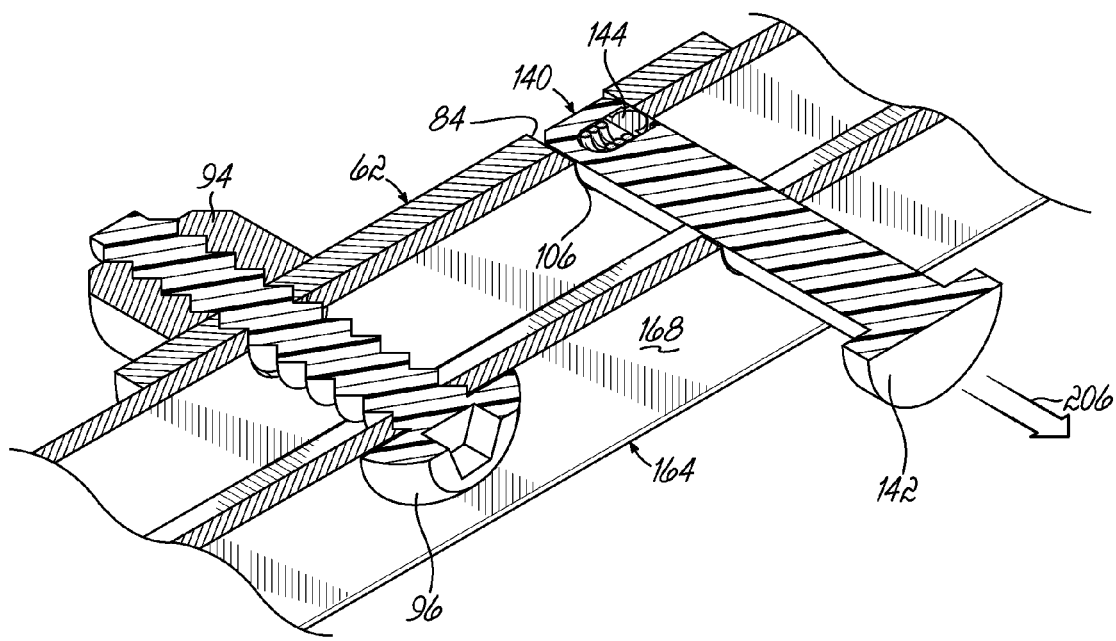
FIG. 11B is a cross-sectional view like FIG. 11A showing the locking pin being pulled out to allow the foundation to collapse.

FIGS. 11A and 11B illustrate locking pin 140 having a head 142 and a spring-loaded stopper 144 described above located only in each of the encircled areas 196 of FIG. 9A. To collapse the foundation core 150 after the removable cover has been removed, each of the twelve locking members 140 must be removed by moving the locking member 140 in the direction of arrow 206 shown in FIGS. 11A and 11B. To lock the foundation core 150 in its erected position, each locking member 140 must be inserted through an opening 68, 84 in one of the L-shaped spacers 60, 62, respectively, and through openings 106 in the opposed walls of the rectangular tubing of the base connecting members of one of the sections 152, 154 (see FIG. 12).

Figure 14A:
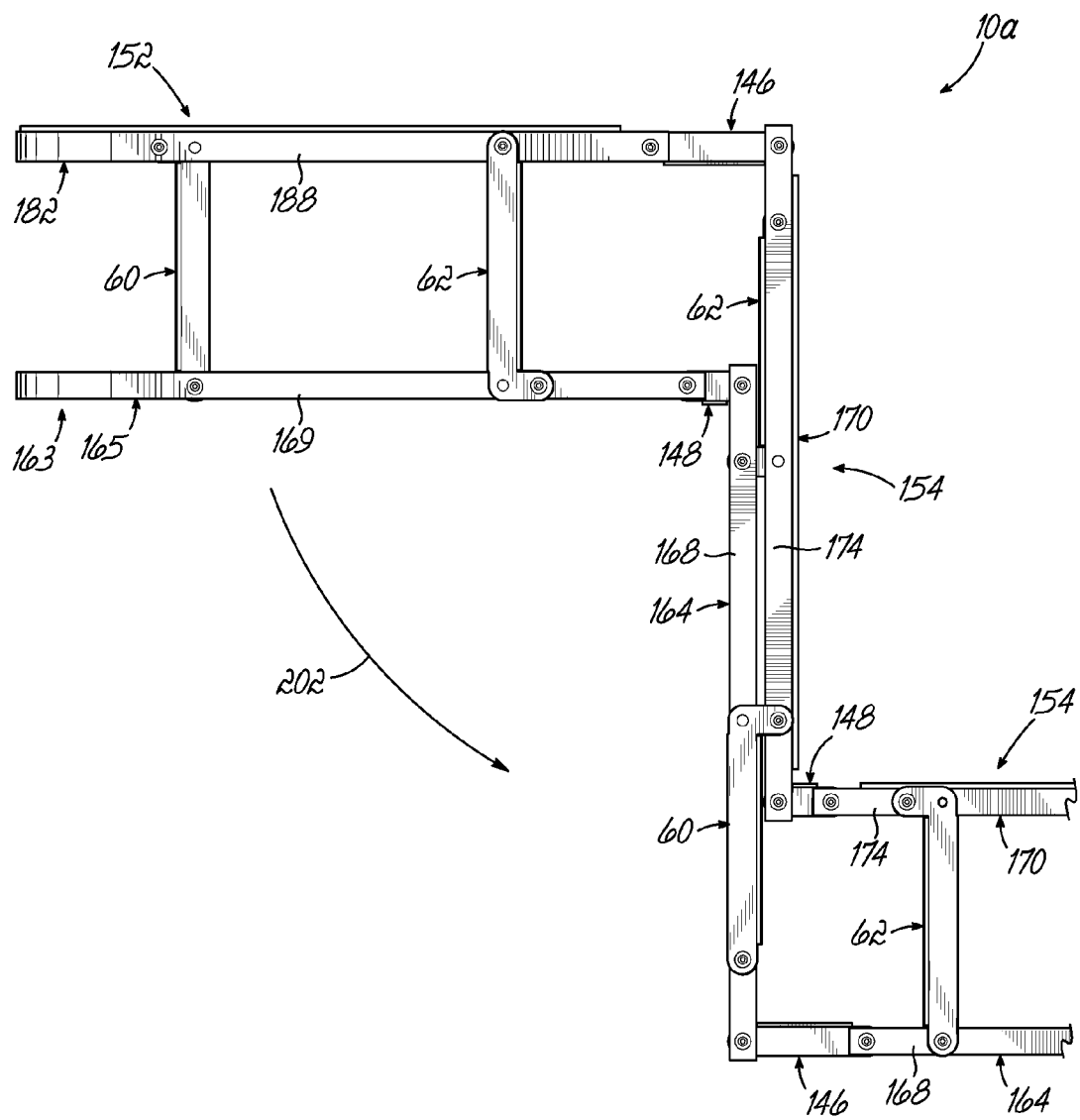
FIG. 14A is a side elevational view of a portion of the bedding foundation of FIG. 9A being partially collapsed.
Figure 14B:
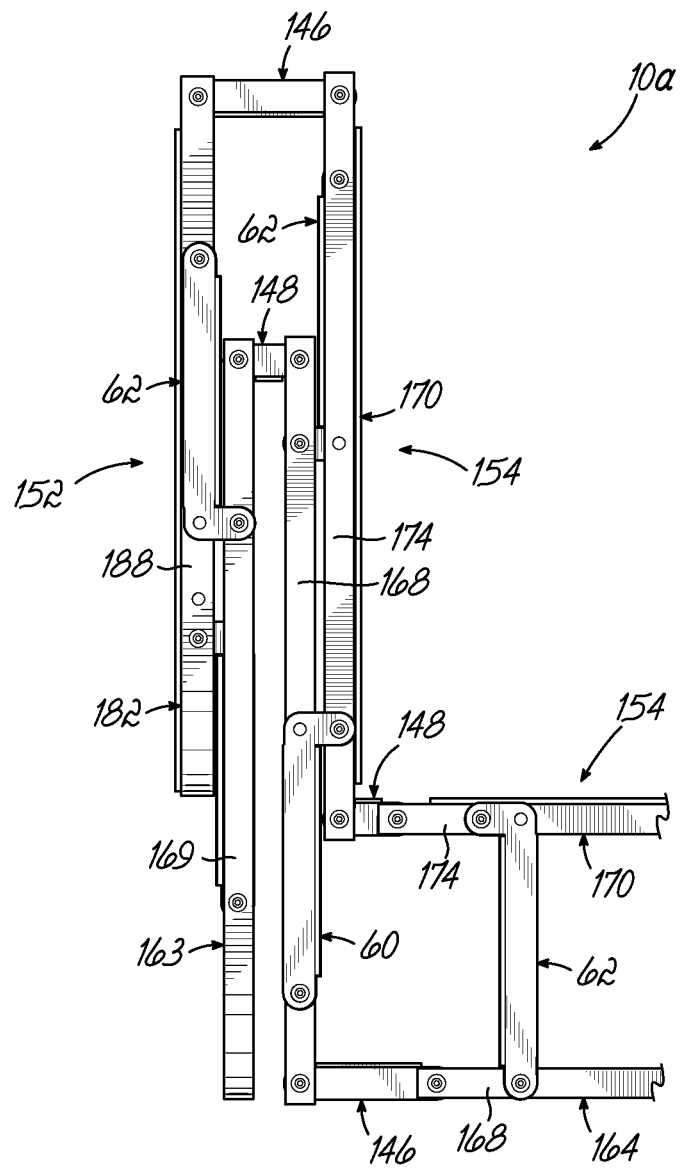
FIG. 14B is a side elevational view of a portion of the bedding foundation of FIG. 9A being partially collapsed.
Figure 14C:
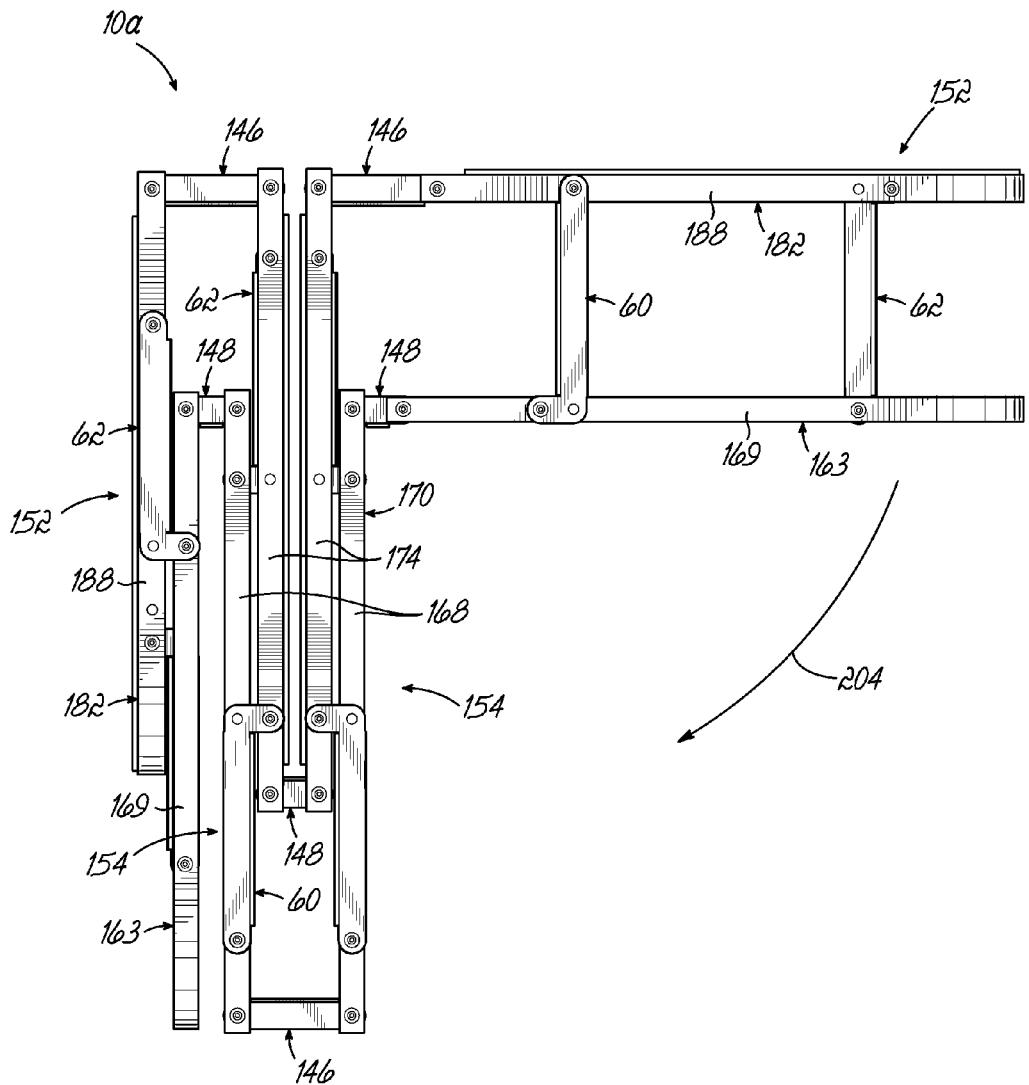
FIG. 14C is a side elevational view of a portion of the bedding foundation of FIG. 9A being partially collapsed.
Figure 14D:
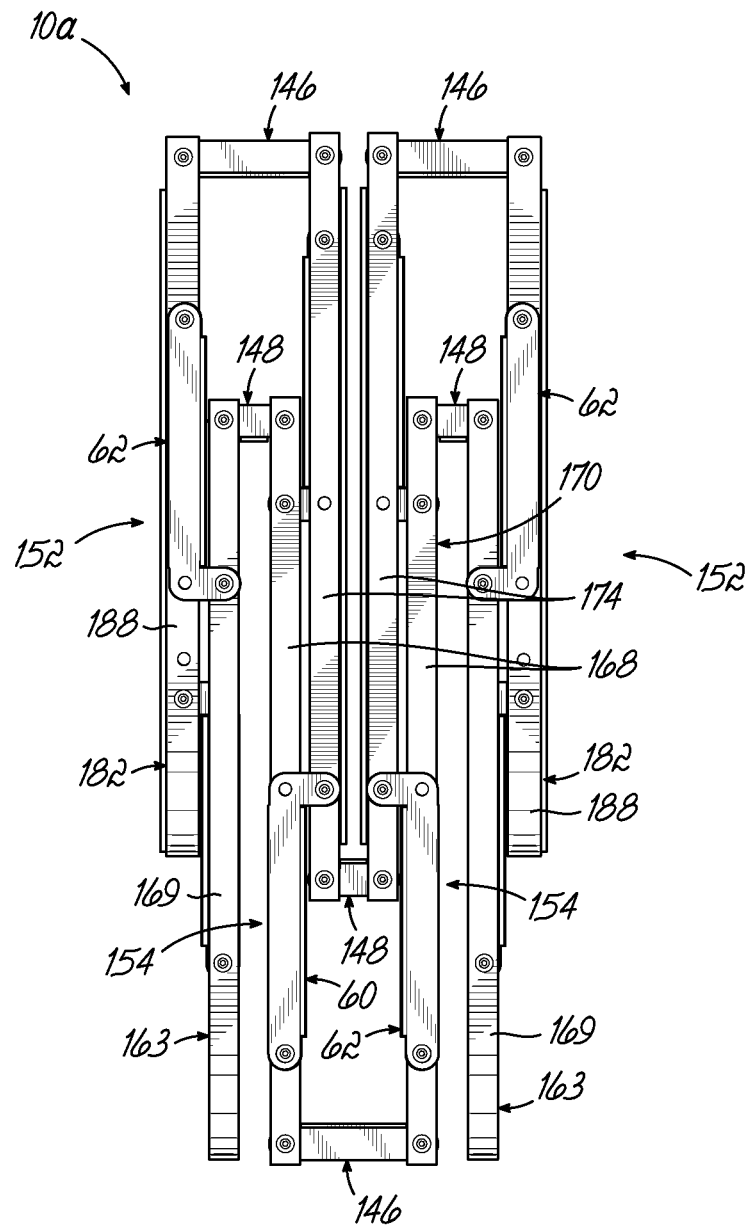
FIG. 14D is a side elevational view of the bedding foundation of FIG. 9A being fully collapsed.

FIGS. 14A-14D illustrate the method of collapsing the foundation 10*a*. FIG. 12 illustrates one of the middle sections 154 being moved from a horizontal position to a vertical position by raising the middle section 154 in the direction of arrows 200 shown in FIG. 12 after three locking pins 140 (shown in FIG. 9A) have been removed (only one being shown in FIG. 12). FIG. 14A illustrates the foundation 10*a* with the middle section 154 in a vertical position. FIG. 14A illustrates the leftmost end section 152 being moved in the counter-clockwise direction shown by the arrow 202. FIG. 14B illustrates the leftmost end section 152 being collapsed and located adjacent the leftmost middle section 154. FIG. 14C illustrates the rightmost end section 152 being moved in the clockwise direction shown by the arrow 204. FIG. 14D illustrates the foundation in its fully collapsed position for storage or shipment, the rightmost end section 152 being collapsed and located adjacent the rightmost middle section 154.

The embodiments of the invention shown and described are for illustrative purposes only. The drawings and the description shall not limit in any way the scope of the invention as defined in the claims. While those skilled in the art may make various changes to, or additional embodiments of, the invention, none of those changes/embodiments shall be deemed to depart from the spirit of the invention. Thus, all such changes/embodiments shall be embraced by the scope of the invention as defined in the claims. Accordingly, the invention is to be limited only by the scope of the following claims and their equivalents.

The invention claimed is:

1. A foldable bedding foundation comprising:
   two end sections, each end section having a base, an upper deck and a plurality of generally L-shaped spacers pivotally secured to said base and upper deck of said end section;
   two middle sections, each of the middle sections having a middle base, a middle upper deck and a plurality of generally L-shaped spacers pivotally secured to said middle base and middle upper deck of said middle section;
   locking members extending through openings in at least some of the generally L-shaped spacers for locking said upper decks spaced from said bases of said end and middle sections, respectively;
   each end section being hinged to one of the middle sections with multiple short hinges and multiple long hinges;
   the middle sections being hinged to each other with multiple short hinges and multiple long hinges;
   wherein each of the spacers has at least three holes and a substantially perpendicularly extending flange sized to abut one of the bases and a perimeter member of one of the upper decks when the foundation is erected.

2. The foldable bedding foundation of claim 1 wherein the base of each of the end sections comprises a hollow generally U-shaped member and at least one cross member, each cross member extending between sides of the generally U-shaped member and being made of rectangular tubing.

3. The foldable bedding foundation of claim 1 wherein each end section is hinged to one of the middle sections with a short hinge and a long hinge secured to and extending between the upper decks of the sections and another short hinge and another long hinge secured to and extending between the bases of the sections.

4. The foldable bedding foundation of claim 1 wherein the middle sections are hinged to each other with a short hinge and a long hinge secured to and extending between the upper decks of the middle sections and another short hinge and another long hinge secured to and extending between the bases of the sections.

5. The foldable bedding foundation of claim 1 wherein the locking members comprise locking pins.

6. The foldable bedding foundation of claim 1 wherein the upper deck of each of the middle sections has multiple longitudinally extending wires welded to hollow perimeter members.

7. The foldable bedding foundation of claim 1 further comprising a removable cover.

8. A foldable bedding foundation comprising:
   two end sections, each end section having a base, an upper deck and a plurality of generally L-shaped spacers pivotally secured to the base and a first perimeter member of the upper deck;
   multiple middle sections, each middle section having a base, an upper deck and plurality of generally L-shaped spacers pivotally secured to sides of the base of the middle section and sides of the upper deck of the middle section;
   locking members extending through openings in at least some of the generally L-shaped spacers and openings in opposed walls of rectangular tubing of the bases for locking said L-shaped spacers in a fixed position and the upper decks spaced from said bases of each of said sections, respectively;
   hinges secured to and extending between adjacent upper decks and adjacent bases;
   wherein each of the spacers has at least three holes and a substantially perpendicularly extending flange sized to abut one of the bases and one of the perimeter members when the foundation is erected.

9. The foldable bedding foundation of claim 8 further comprising a removable covering.

10. The foldable bedding foundation of claim 8 wherein the locking members are locking pins.

11. The foldable bedding foundation of claim 10 wherein said bedding foundation may be collapsed by removing the locking pins.

12. The foldable bedding foundation of claim 8 wherein the spacers comprise left-hand spacers and right-hand spacers.

13. The foldable bedding foundation of claim 8 wherein the perimeter of each base is made of rectangular tubing.

14. The foldable bedding foundation of claim 8 wherein said foundation has multiple columns of spacers.

15. A foldable bedding foundation comprising:
   a first end section having a first base, including a first generally U-shaped base member and a middle base member, a first upper deck including a first perimeter deck member and a middle member extending between ends of the first perimeter deck member, and right-hand and left-hand generally L-shaped spacers pivotally secured to the first base and the first upper deck;
   a second end section having a second base, including a second generally U-shaped base member and a middle base member, a second upper deck including a second perimeter deck member and a middle member extending between ends of the second perimeter deck member, and right-hand and left-hand generally L-shaped spacers pivotally secured to the second base and the second upper deck;
   first and second middle sections hingedly secured to said first and second end sections, respectively and hingedly secured to each other;
   locking members extending through openings in at least some of the generally L-shaped spacers for locking said L-shaped spacers in a fixed position and the first and second upper decks spaced from said first and second bases of said first and second end sections, respectively; and
   a removable covering;
   wherein each of the spacers has at least three holes and a substantially perpendicularly extending flange sized to abut one of the bases and one of the perimeter members when the foundation is erected.

16. The foldable bedding foundation of claim 15 wherein each of the base members is hollow.

17. The foldable bedding foundation of claim 15 wherein the foundation has multiple short hinges and multiple long hinges.

* * * * *